(12) United States Patent
Chen et al.

(10) Patent No.: US 9,014,210 B2
(45) Date of Patent: Apr. 21, 2015

(54) METHOD AND APPARATUS FOR MANAGING RETRANSMISSION RESOURCES

(71) Applicant: Qualcomm Incorporated, San Diego, CA (US)

(72) Inventors: Wanshi Chen, San Diego, CA (US); Jelena M. Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/666,818

(22) Filed: Nov. 1, 2012

(65) Prior Publication Data

US 2013/0114530 A1 May 9, 2013

Related U.S. Application Data

(60) Provisional application No. 61/707,809, filed on Sep. 28, 2012, provisional application No. 61/679,456, filed on Aug. 3, 2012, provisional application No. 61/556,134, filed on Nov. 4, 2011.

(51) Int. Cl.

| | |
|---|---|
| H04J 3/16 | (2006.01) |
| H04J 11/00 | (2006.01) |
| H04W 72/04 | (2009.01) |
| H04L 1/18 | (2006.01) |
| H04L 5/00 | (2006.01) |

(52) U.S. Cl.
CPC ........... H04W 72/042 (2013.01); H04L 1/1861 (2013.01); H04L 5/0055 (2013.01)

(58) Field of Classification Search
CPC ... H04L 5/0055; H04L 5/0096; H04L 5/0057; H04W 72/042
USPC ............ 370/329, 330, 468, 395.21, 332, 336, 370/426, 342, 315, 203–210; 714/748–749
See application file for complete search history.

(56) References Cited

U.S. PATENT DOCUMENTS

| | | |
|---|---|---|
| 8,249,022 B2 | 8/2012 | Dalsgaard et al. |
| 8,737,299 B2 * | 5/2014 | Liao ............................... 370/328 |
| 2010/0067512 A1 * | 3/2010 | Nam et al. .................... 370/342 |
| 2011/0305213 A1 | 12/2011 | Lohr et al. |
| 2012/0026935 A1 * | 2/2012 | Park et al. ...................... 370/315 |
| 2012/0224532 A1 | 9/2012 | Suzuki et al. |
| 2012/0236811 A1 | 9/2012 | Ishii et al. |
| 2012/0236812 A1 | 9/2012 | Chen et al. |
| 2012/0250523 A1 | 10/2012 | Miki |
| 2013/0034070 A1 * | 2/2013 | Seo et al. ....................... 370/329 |
| 2013/0051342 A1 * | 2/2013 | Aiba et al. .................... 370/329 |

FOREIGN PATENT DOCUMENTS

EP 2381735 A1 10/2011

OTHER PUBLICATIONS

International Search Report and Written Opinion—PCT/US2012/063416—ISA/EPO—Jan. 25, 2013 (120419WO).
LG Electronics: "Uplink ACK/NACK resource allocation in TDD", 3GPP DRAFT; R1-081568 UL ACKNACK in TDD.REV, 3RD Generation Partnership Project (3GPP), Mobile Competence Centre ; 650, Route Des Lucioles ; F-06921 Sophia-Antipolis Cedex ; France, vol. RAN WG1, No. Shenzhen, China; Apr. 9, 2008, XP050109983, [retrieved on Apr. 9, 2008].
NEC Group: "Detail on mapping between ACK/NACK index and CCE index". 3GPP Draft; RI-081020, 3RD Generation Partnership Project (3GPP). Mobile Competence Centre; 650. Route Des Lucioles; F 06921 Sophia-Antipolis Cedex; France. vol. RAN WGI. No. Sorrento. Italy; Feb. 6, 2008. XP050109483. [retrieved on Feb. 6, 2008].

* cited by examiner

*Primary Examiner* — Hanh N Nguyen
(74) *Attorney, Agent, or Firm* — Arent Fox LLP

(57) ABSTRACT

A method, a computer program product, and an apparatus for determining retransmission feedback resources are provided. An apparatus receives a downlink resource assignment over a control channel and obtains an offset related to a region for retransmission feedback resources. The offset is determined based on a type of the control channel. The apparatus determines resources for communicating retransmission feedback for communications received over the downlink resource assignment based on an index of a resource related to the downlink resource assignment and the offset. The apparatus transmits retransmission feedback for the communications over the resources.

136 Claims, 17 Drawing Sheets

METHOD AND APPARATUS FOR MANAGING RETRANSMISSION RESOURCES

CROSS-REFERENCE TO RELATED APPLICATION(S)

This application claims the benefit of U.S. Provisional Application Ser. No. 61/556,134, entitled METHOD AND APPARATUS FOR MANAGING RETRANSMISSION RESOURCES and filed on Nov. 4, 2011, which is expressly incorporated by reference herein in its entirety; U.S. Provisional Application Ser. No. 61/679,456, entitled METHOD AND APPARATUS FOR MANAGING RETRANSMISSION RESOURCES and filed on Aug. 3, 2012, which is also expressly incorporated by reference herein in its entirety; and U.S. Provisional Application Ser. No. 61/707,809, entitled METHOD AND APPARATUS FOR MANAGING RETRANSMISSION RESOURCES and filed on Sep. 28, 2012, which is also expressly incorporated by reference herein in its entirety.

BACKGROUND

1. Field

Aspects of the present disclosure relate generally to wireless communication systems, and more particularly to utilizing resources for retransmission feedback.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station, such as an enhanced NodeB (eNB) via the downlink and uplink. The downlink (or forward link) refers to the communication link from the base station to the UE, and the uplink (or reverse link) refers to the communication link from the UE to the base station. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, wireless networks can support carrier aggregation (CA), additional carrier types, coordinated multiple point (CoMP), and similar evolved communication technologies. For example, carrier aggregation can relate to assigning multiple carriers to a device to receive communications from one or more base stations. One of the multiple carriers, for example, can be an anchor carrier over which the device can communicate control data while receiving user plane data over substantially all carriers. This can improve communication throughput at the device. In CoMP, multiple base stations can communicate coordinated data with the device over distinct resources established with the multiple base stations. Thus, throughput is increased at the device in this case as well since the device can simultaneously receive from the multiple base stations. With such evolution of communication technologies, some concepts may become insufficient to support the communication technologies, such as current control channel definitions (e.g., physical downlink control channel (PDCCH) in LTE). In LTE, for example, a control channel is defined in the first n symbols of a subframe, where n is between one and three. Such resources may not be sufficient for a number of served devices using evolved communication technologies.

SUMMARY

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with defining resource grants over an enhanced control channel and a legacy control channel. For example, the enhanced control channel can be defined by various time division multiplexing (TDM), frequency division multiplexing (FDM) or other resources in a subframe, and the resources utilized can vary for uplink and downlink grants over the enhanced control channel. Retransmission feedback resources can be assigned for the downlink grants based on at least one of an implicit assignment corresponding to one or more parameters (e.g., a control channel element (CCE) or physical resource block (PRB) of the control channel, a PRB of the scheduled downlink grant, and/or the like), a layer 3 signaling of the assignment (e.g., and/or multiple assignments with a resource selection indicator), and/or the like. Moreover, for example, the pool of resources from which the retransmission feedback resources are assigned can be managed separately for the enhanced control channel and a legacy control channel for orthogonal assignment of the resources.

In an aspect of the disclosure, a method, a computer program product, and an apparatus for determining retransmission feedback resources are provided. The apparatus receives a downlink resource assignment and obtains an offset related to a region for retransmission feedback resources. The apparatus determines resources for communicating retransmission feedback for communications received over the downlink resource assignment based on an index of a resource related to the downlink resource assignment and the offset. The apparatus transmits retransmission feedback for the communications over the resources.

In another aspect, as apparatus receives a downlink resource assignment over a control channel and obtains an offset related to a region for retransmission feedback resources. The offset is determined based on a type of the control channel. The apparatus determines resources for communicating retransmission feedback for communications received over the downlink resource assignment based on an index of a resource related to the downlink resource assignment and the offset. The apparatus transmits retransmission feedback for the communications over the resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
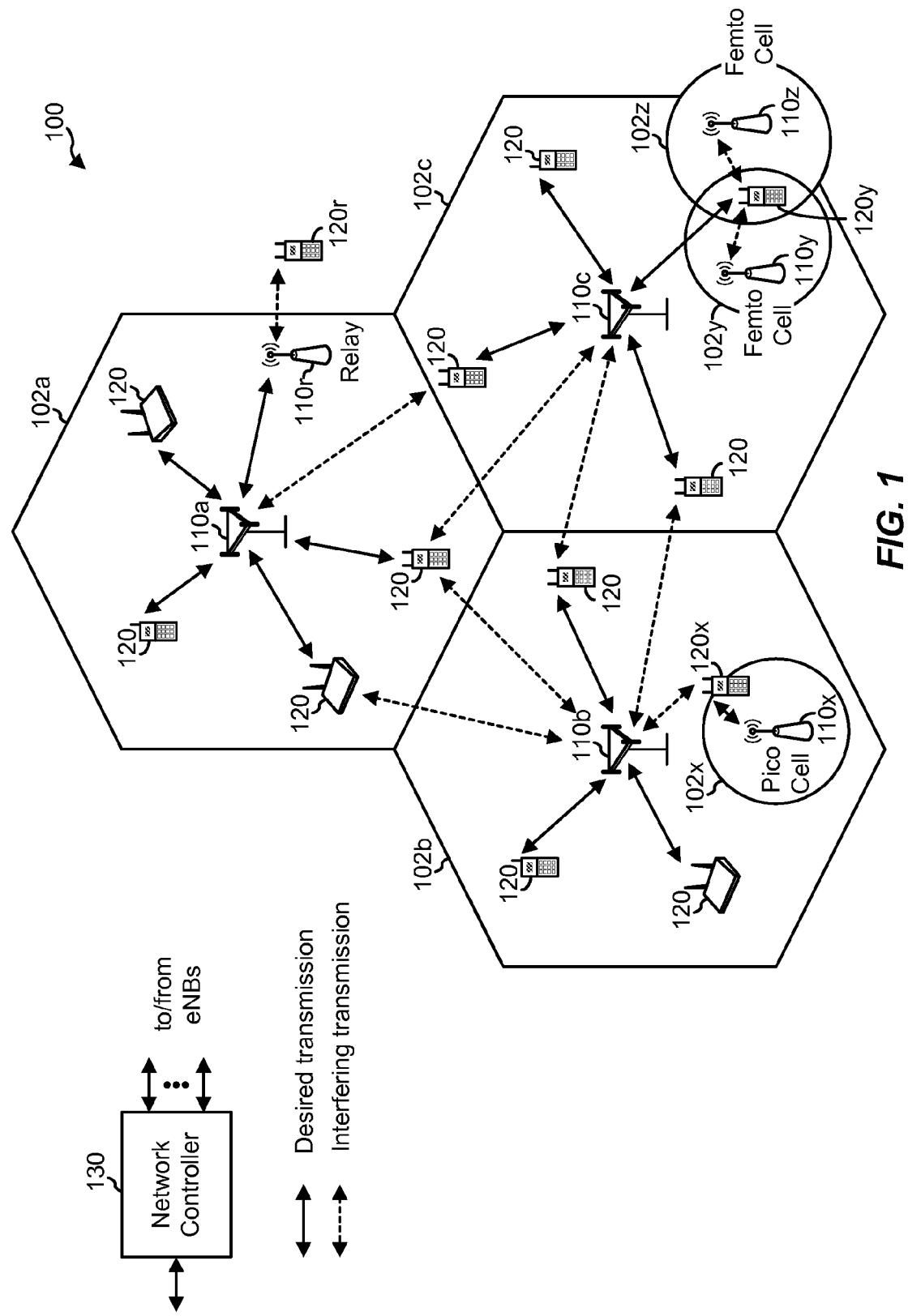
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Described herein are aspects related to determining resources for communicating retransmission feedback for communications received over a downlink resource assignment. An enhanced control channel can be defined that can have varying structures, using time division multiplexing (TDM), frequency division multiplexing (FDM), and/or the like for uplink and/or downlink channel assignments over various resources. Thus, retransmission feedback resource assignment can be defined to accommodate the enhanced control channel. For example, retransmission feedback resources can be derived from one or more aspects of a downlink resource assignment received over the enhanced control channel, such as an index of a physical resource block (PRB) thereof, an index of a PRB specified in the downlink resource assignment, and/or the like. In other examples, the retransmission feedback resources can be assigned using layer 3 (e.g., radio resource control (RRC) layer) signaling. Moreover, though described herein in terms of downlink resource assignments and determining resources for uplink retransmission feedback regarding the downlink resources, it is to be appreciated that the concepts and functionality can be similarly applied to uplink resource assignments and downlink retransmission resources.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 (e.g., UE 120x, 120y, etc.) may be dispersed throughout the wireless network 100, and each UE may be stationary or mobile. A UE may also be referred to as a device, a terminal, a mobile station, a subscriber unit, a station, etc. A UE may be a cellular phone, a smart phone, a personal digital assistant (PDA), a wireless modem (or other tethered device), a wireless communication device, a handheld device, a laptop computer, a tablet, a netbook, a smartbook, an ultrabook, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM or a similar multiplexing scheme and in the time domain with SC-FDM or a similar multiplexing scheme. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
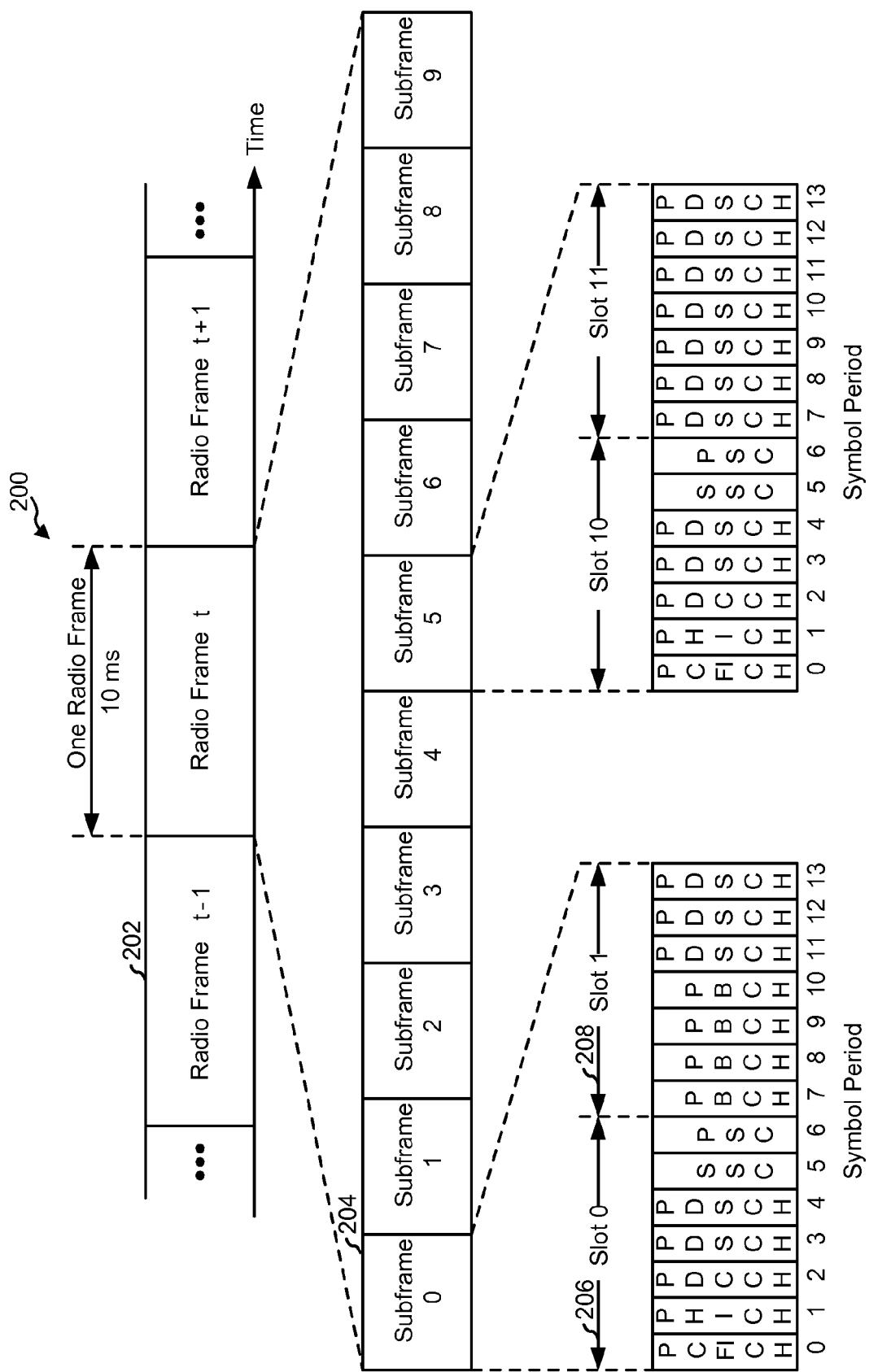
FIG. 2 is a block diagram conceptually illustrating an example of a downlink frame structure in a telecommunications system.

FIG. 2 shows a downlink frame structure 200 used in LTE. The transmission timeline for the downlink may be partitioned into units of radio frames, such as radio frame 202. Each radio frame may have a predetermined duration (e.g., 10 milliseconds (ms)) and may be partitioned into 10 subframes with indices of 0 through 9, such as subframe 0 (204). Each subframe may include two slots, such as slot 0 206 and slot 1 208. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into RBs. Each RB may cover N subcarriers (e.g., 12 subcarriers) in one slot.

In LTE, an eNB may send a primary synchronization signal (PSS or PSC) and a secondary synchronization signal (SSS or SSC) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 RBs. In the example shown in FIG. 2, M=3. The eNB may send a Physical hybrid automatic repeat/request (HARM) Indicator Channel (PHICH) and a Physical Downlink Control Channel (PDCCH) in the first M symbol periods of each subframe (M=3 in FIG. 2). The PHICH may carry information to support hybrid automatic retransmission (HARM). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels can correspond to an LTE configuration.

The eNB may send the PSS, SSS and PBCH in a center of the system bandwidth used by the eNB (e.g., a center 1.08 megahertz (MHz)). The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REG). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
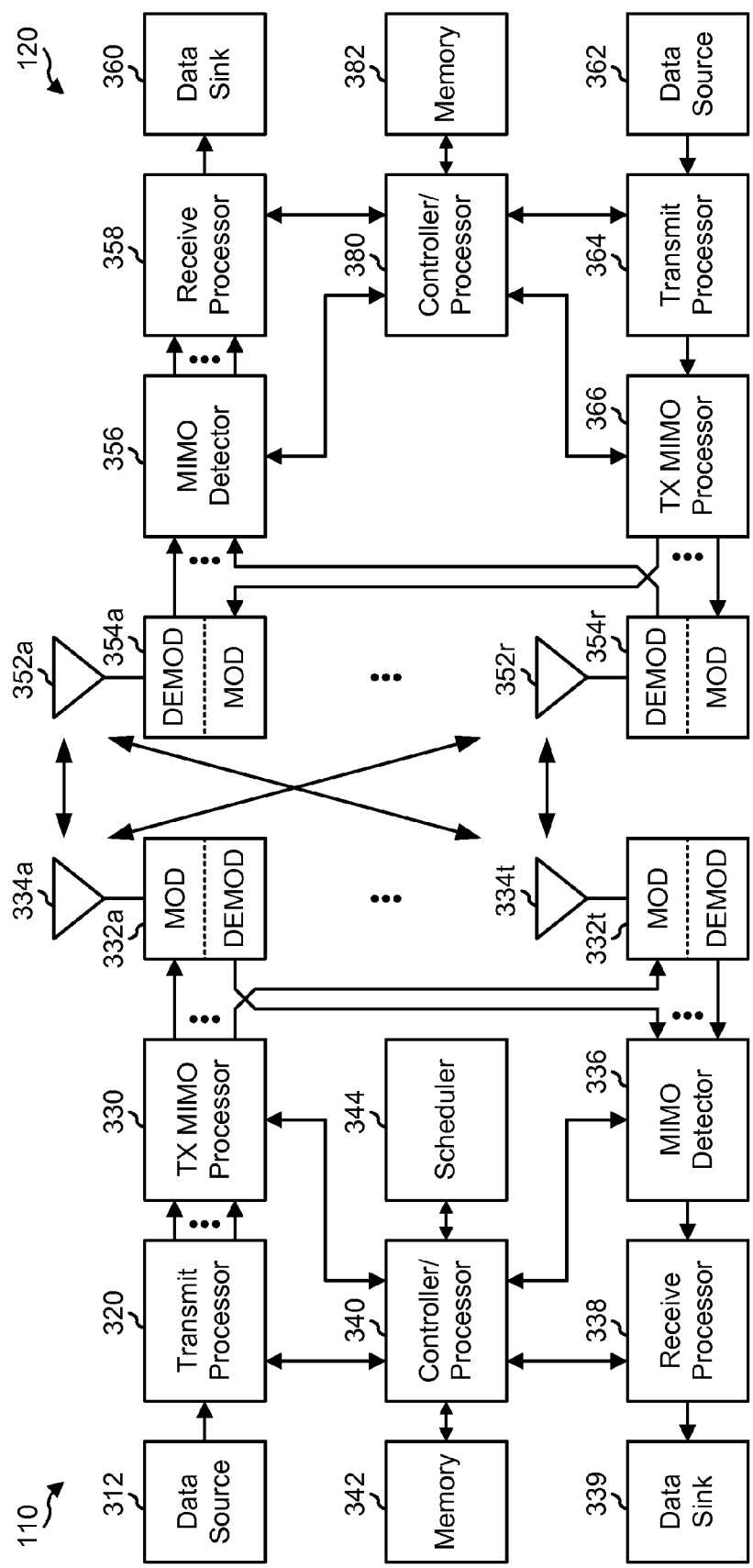
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in, e.g., FIG. 10, and/or other processes for the techniques described herein. In addition, for example, the processor 380 can comprise or at least be operatively coupled to components illustrated in, e.g., FIGS. 8 and 12, for performing aspects described herein. The memories 342 and 382 may store data and program codes for the base station 110 and the UE 120, respectively, which can include instructions for executing the methods in FIGS. 10-11, 14-15, the components in FIGS. 8, 12-13, and 16-17, and/or the like. A scheduler 344 may schedule UEs for data transmission on the downlink and/or uplink.

Carrier Aggregation:

LTE-Advanced UEs can use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100

Mhz. These asymmetric FDD assignments can conserve spectrum and are a good fit for the typically asymmetric bandwidth utilization by broadband subscribers, though other assignments can be possible.

Figure 4A:
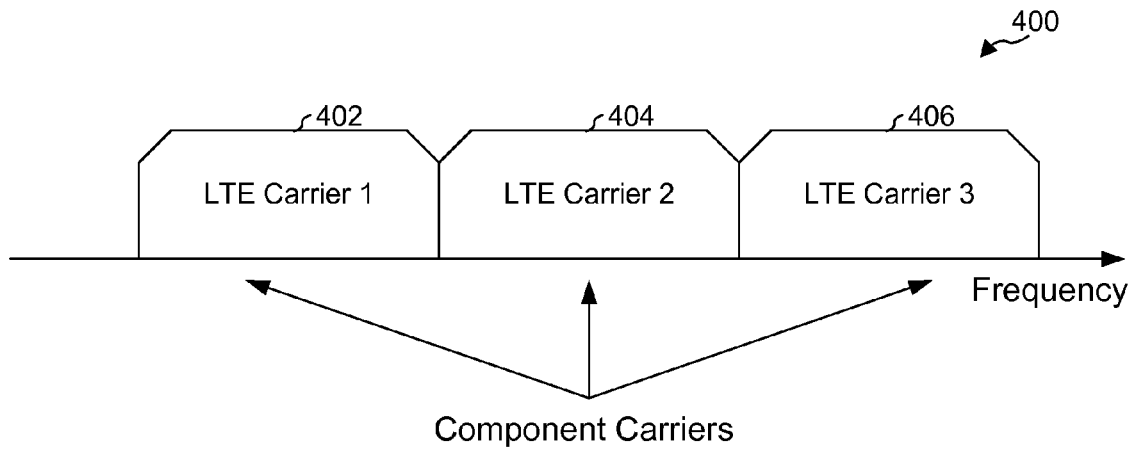
FIG. 4A discloses a continuous carrier aggregation type.
Figure 4B:
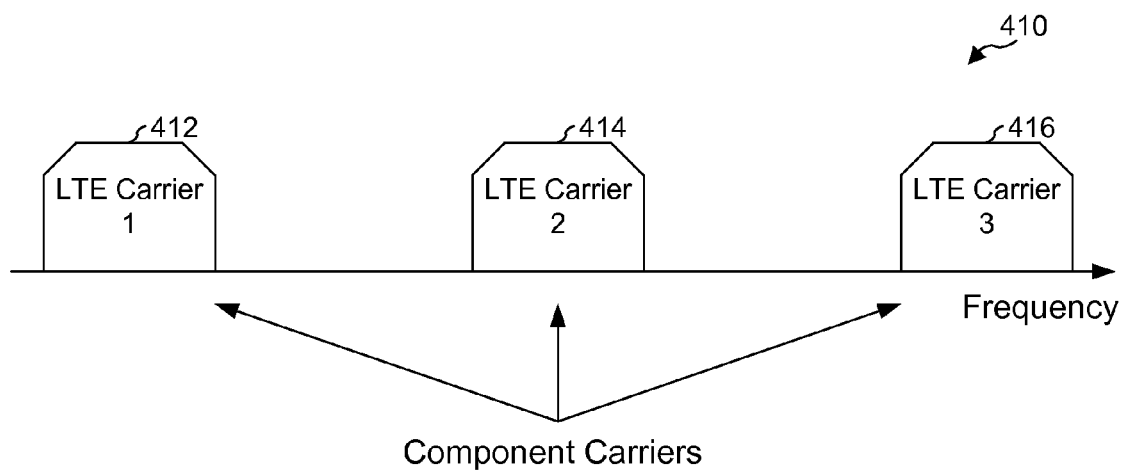
FIG. 4B discloses a non-continuous carrier aggregation type.

Carrier Aggregation Types:

For the LTE-Advanced mobile systems, two types of carrier aggregation (CA) methods have been proposed, continuous CA and non-continuous CA, examples of which are illustrated in FIGS. 4A and 4B. Non-continuous CA occurs when multiple available component carriers 410 are separated along the frequency band (FIG. 4B). On the other hand, continuous CA occurs when multiple available component carriers 400 are adjacent to each other (FIG. 4A). As shown, for example, in continuous CA, carrier 1 402, carrier 2 404, and carrier 3 406 are adjacent in frequency. In non-continuous CA, carrier 1 412, carrier 2 414, and carrier 3 416 are not adjacent in frequency. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Figure 5:
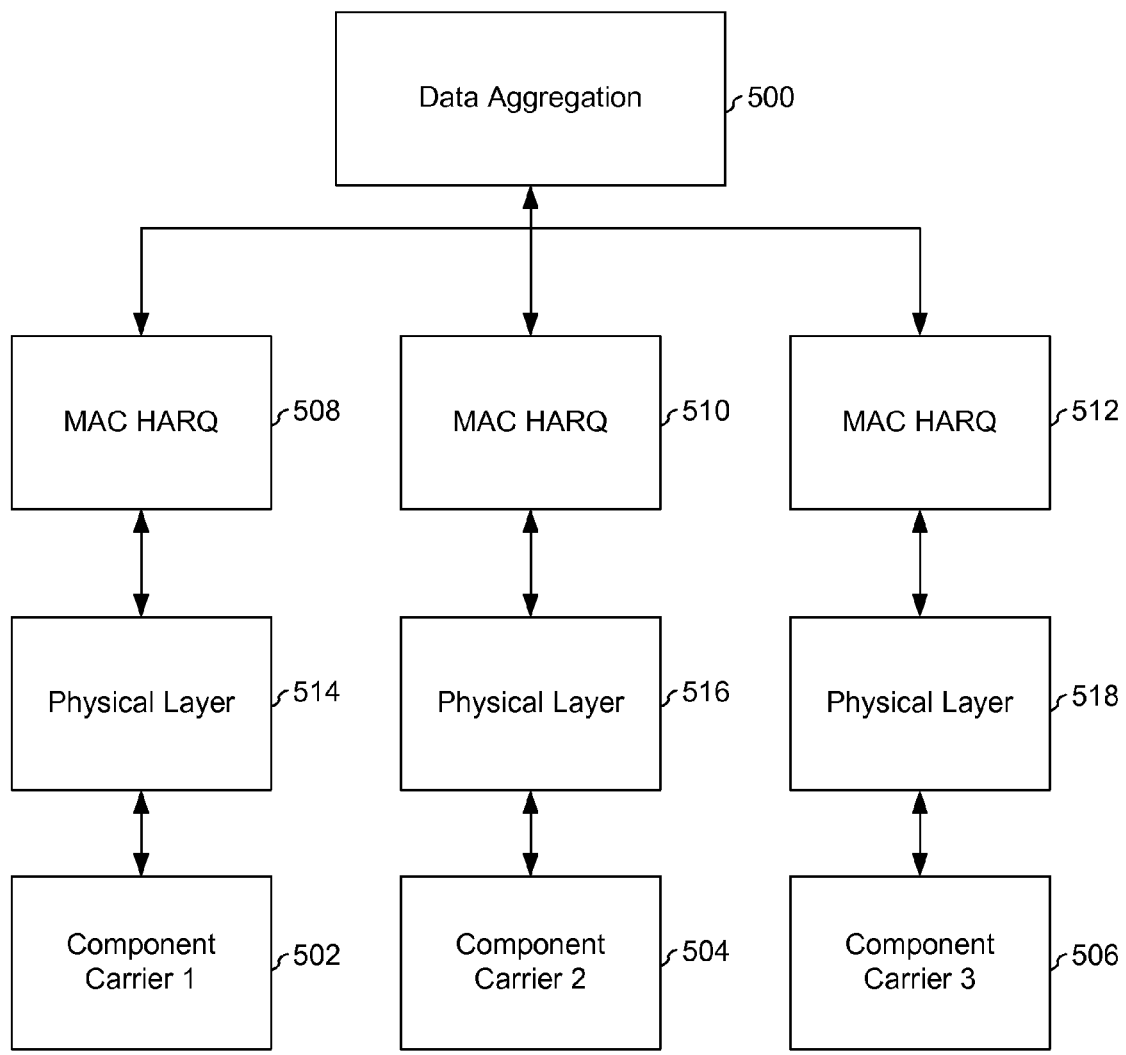
FIG. 5 discloses MAC layer data aggregation.

Data Aggregation Schemes:

FIG. 5 illustrates performing data aggregation 500 to aggregate transmission blocks (TBs) from different component carriers 502, 504, and 506 at the medium access control (MAC) layer (FIG. 5) for an International Mobile Telecommunications (IMT)-Advanced or similar system. With MAC layer data aggregation, each component carrier has its own independent hybrid automatic repeat request (HARQ) entity 508, 510, and 512 in the MAC layer and its own transmission configuration parameters (e.g., transmitting power, modulation and coding schemes, and multiple antenna configuration) in the physical layer. Similarly, in the physical layer, one HARQ entity 514, 516, and 518 can be provided for each component carrier.

Control Signaling:

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control:

It is preferable to support transmission continuity during the handover procedure across multiple cells when CA is used for IMT-Advanced UE. However, reserving sufficient system resources (e.g., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Figure 6:
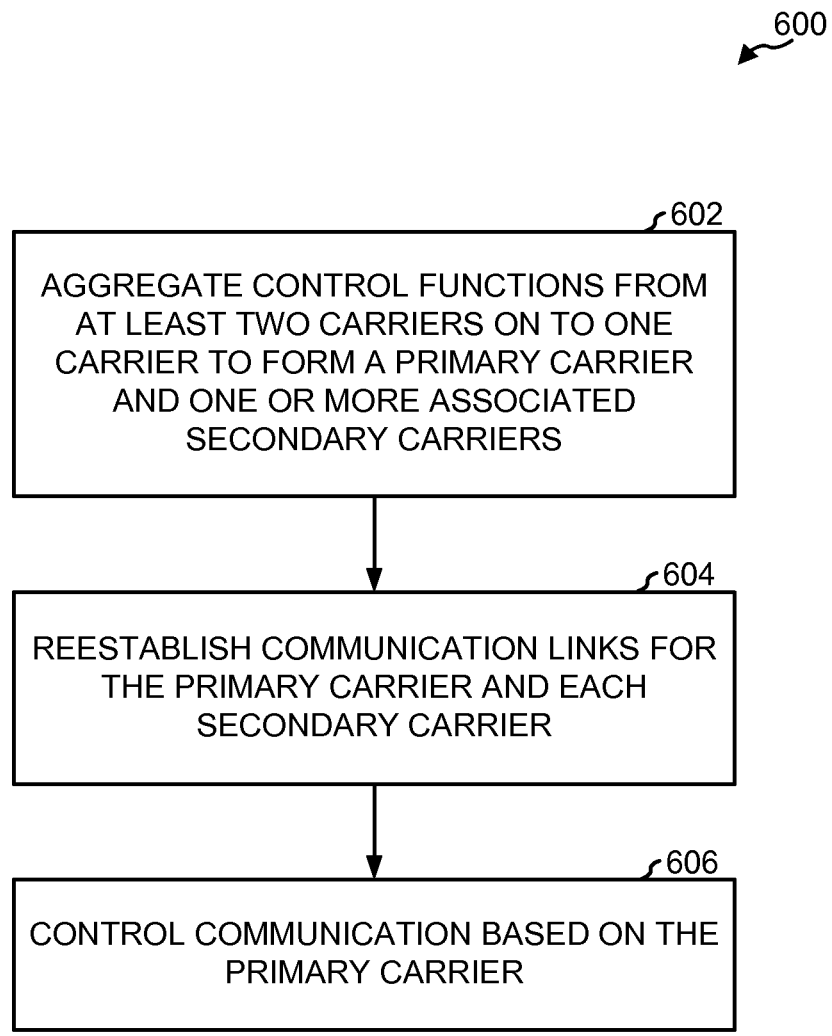
FIG. 6 is a block diagram illustrating a methodology for controlling radio links in multiple carrier configurations.

FIG. 6 illustrates a methodology 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next at block, 604, communication links are established for the primary carrier and each secondary carrier. Then, communication is controlled based on the primary carrier in block 606.

Enhanced PDCCH

The following concepts can be applied to a single carrier, two or more carriers in CA, coordinated multiple point (CoMP), a new carrier type, and/or other configurations alike, such that an enhanced control channel can be defined allowing resource granting within resources of various portions of a subframe. Moreover, retransmission resources related to the grants can be assigned based on one or more parameters, by explicit signaling, and/or the like.

Figure 7:
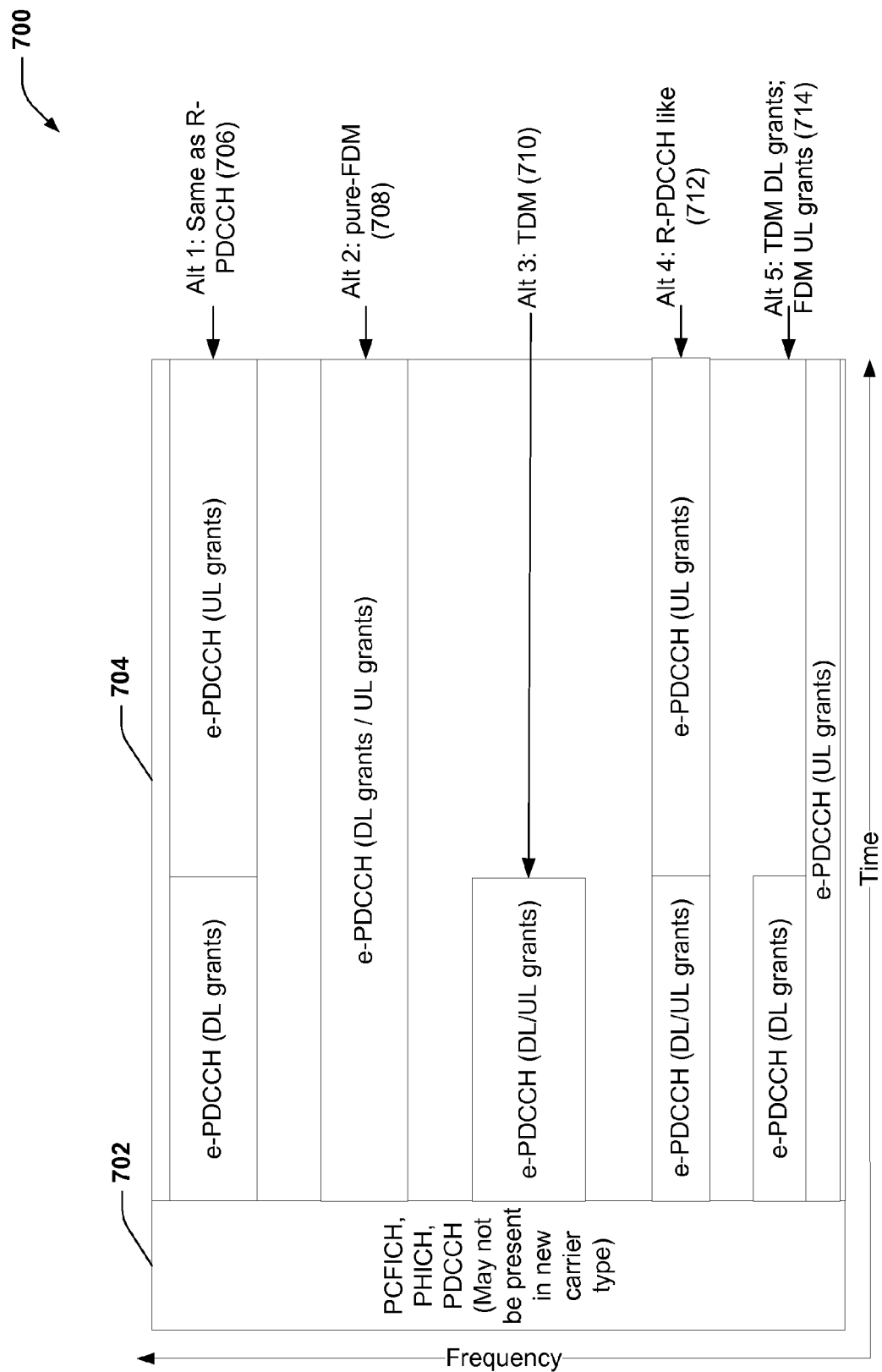
FIG. 7 is a block diagram of resource allocations for a plurality of enhanced control channel designs.

FIG. 7 illustrates various example enhanced PDCCH (e-PDCCH) structures 700 in an example portion of time over a portion of frequency, which can be a subframe. For example, a portion of initial resources in the subframe can be reserved for a legacy control region 702 for communicating control data to legacy devices, which can include PDCCH, PCFICH, PHICH, and/or similar channels. In LTE, the legacy control region 702 can be a number of OFDM symbols, n, in the subframe where n can be between one and three. It is to be appreciated that where e-PDCCH is defined for a new carrier type, the legacy control region 702 may not be present. The remaining resources can comprise a data region 704 of the subframe.

Five alternatives are depicted for defining an enhanced control channel structure, though it is to be appreciated that other alternatives are possible. For example, an enhanced control channel structure can support increased control channel capacity, support frequency domain inter-cell interference coordination (ICIC), achieve improved spatial reuse of control channel resources, support beamforming and/or diversity, operate on a new carrier type and in multimedia broadcast over single frequency network (MBSFN) subframes, coexist on the same carrier as legacy devices, etc.

In alternative 1 (706), the enhanced control channel structure can be similar to relay-PDCCH (R-PDCCH), such that downlink grants are assigned over the control channel in at least a portion of frequency over a first portion of region 704, and uplink grants are assigned over the control channel in the portion of frequency over a second portion of the region 704. In alternative 2 (708), the enhanced control channel structure allows downlink and uplink grants to be assigned over a portion of frequency in region 704 using FDM to separate assignments. In alternative 3 (710), the enhanced control channel structure allows downlink and uplink grants to be assigned over a portion of frequency using TDM in at least a portion of region 704. In alternative 4 (712), the enhanced control channel structure allows downlink and uplink grants to be assigned over the control channel in at least a portion of frequency over a first portion of region 704, and uplink grants are assigned over the control channel in the portion of frequency over a second portion of the region 704. In alternative 5 (714), downlink grants can be assigned using TDM over at least a portion of region 704, while uplink grants can be assigned using FDM in a different portion of frequency over region 704.

Using one or more of the alternatives, it is to be appreciated that an enhanced control channel can allow assignment of resources using various multiplexing schemes for downlink and/or uplink assignments as compared to conventional legacy control channel structures. Thus, retransmission feedback resource assignment for an enhanced control channel can be defined to accommodate one or more of the enhanced alternative control channel structures. In one example, the retransmission feedback resources can be implicitly and/or dynamically derived based on one or more other parameters. In another example, retransmission feedback resources can be assigned using layer 3 (e.g., radio resource control (RRC) layer) signaling to explicitly indicate retransmission resources or related parameters for determining retransmission resources to a device.

Figure 8:
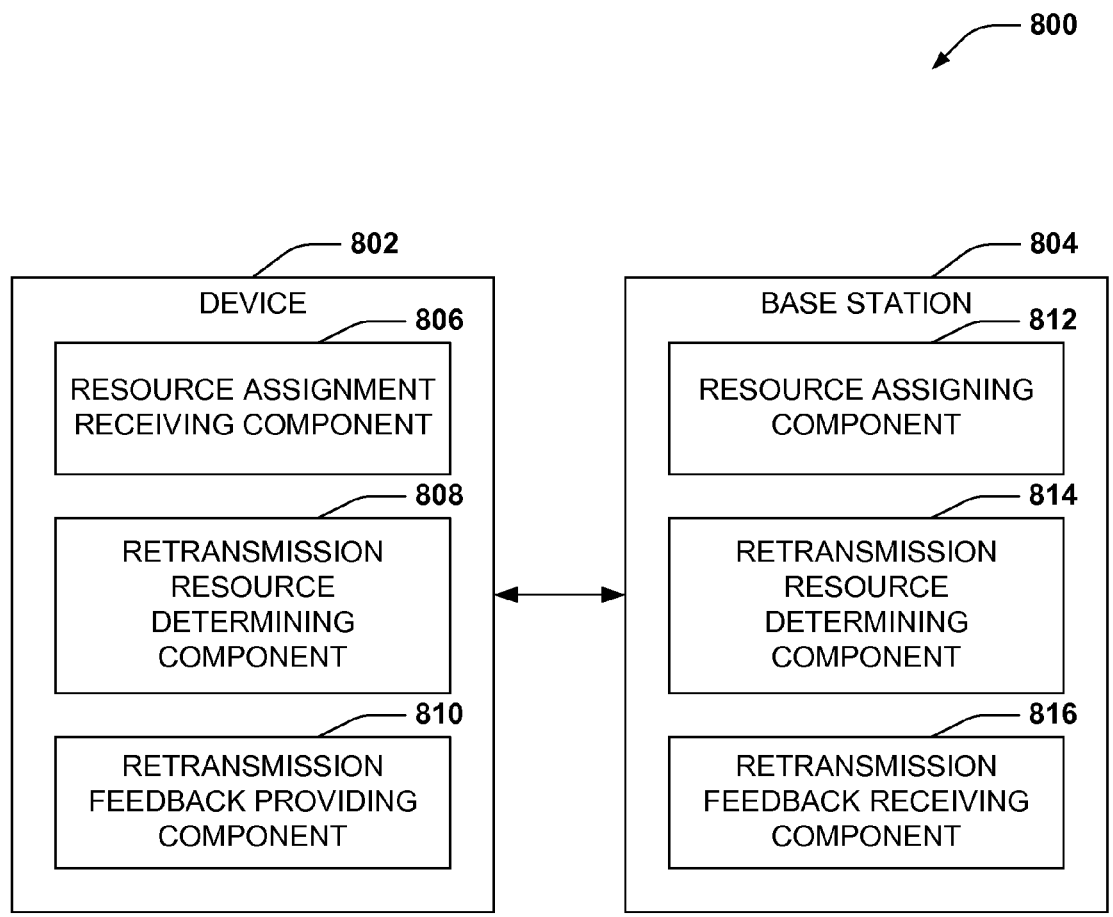
FIG. 8 is a block diagram of a system for determining retransmission feedback resources related to a downlink resource assignment.

FIG. 8 illustrates an example system 800 for determining retransmission feedback resources. System 800 includes a device 802 that communicates with a base station 804, where the base station 804 can provide wireless network access to the device 802. Device 802 can be a UE, modem (or other tethered device), a portion thereof, and/or the like. Base station 804 can be a macro base station, femto node, pico node, mobile base station, relay, device (e.g., communicating in peer-to-peer or ad-hoc mode with device 802), a portion thereof, and/or the like.

Device 802 comprises a resource assignment receiving component 806 for receiving a resource assignment or grant from a base station for receiving communications there from and/or transmitting communications thereto, a retransmission resource determining component 808 for determining one or more resources over which to transmit retransmission feedback for the resource assignment, and a retransmission feedback providing component 810 for communicating retransmission feedback over the resources.

Base station 804 can include a resource assigning component 812 for providing a resource assignment or grant to one or more devices, a retransmission resource determining component 814 for determining one or more resources over which retransmission feedback is to be received for the resource assignment, and a retransmission feedback receiving component 816 for obtaining retransmission feedback from the device over the resources.

According to an example, resource assigning component 812 can assign downlink resources to device 802 for receiving communications from base station 804. Resource assigning component 812 can assign the downlink resources over an enhanced control channel, as described herein. Resource assignment receiving component 806 can obtain the downlink resource assignment from the base station, and retransmission resource determining component 808 can determine resources in an uplink control channel region to utilize in communicating retransmission feedback for communications received over resources specified in the downlink resource assignment. For example, the retransmission feedback can relate to HARQ feedback, such as acknowledgement (ACK)/non-acknowledgement (NACK) or similar feedback values that can specify whether retransmission of communications over the downlink resource assignment is desired.

In one example, retransmission resource determining component 808 can determine the resources to use for retransmission based on one or more parameters, such as a first control channel element (CCE) over which the downlink resource assignment is received by resource assignment receiving component 806, a first physical resource block (PRB) over which the downlink resource assignment is received, a first PRB specified in the downlink resource assignment for data transmission, and/or the like. This allows the retransmission feedback resources to be mapped to an actual downlink resource assignment, rather than being mapped per device (which may result in unused feedback resources). As an example, if an e-PDCCH schedules a corresponding data transmission, retransmission resource determining component 808 can use a first PRB of the data transmission to determine ACK/NACK resource. If an e-PDCCH does not have a corresponding data (e.g., an e-PDCCH indicating downlink semi-persistent scheduling (SPS) release, where there is no associated data transmission but an ACK may be required for the UE to acknowledge the reception of the downlink release), retransmission resource determining component 808 can use a first PRB or a starting CCE of the e-PDCCH transmission to determine ACK/NACK resource. Alternatively, for this case, retransmission resource determining component 808 can derive ACK/NACK resource based on a RRC configuration.

For example, retransmission resource determining component 808 can determine an index of the resources for retransmission feedback as a function of an index of or relating to the CCE, PRB, etc. Retransmission feedback providing component 810 can accordingly communicate retransmission feedback for communications received in the downlink resources over the determined retransmission feedback resources. Retransmission resource determining component 814 can similarly determine resources over which the device 802 transmits retransmission feedback based on the downlink resource assignment provided to device 802. Thus, retransmission feedback receiving component 816 can obtain the feedback from device 802 and can associate the feedback with the appropriate downlink resources to determine whether to retransmit a communication over the downlink resources.

In one specific example, retransmission feedback resources are assigned to legacy devices according to a first CCE index over which the resource assignment is received. Retransmission resource determining components 808 and 814, however, can determine retransmission feedback resources for a given downlink resource assignment over an enhanced control channel based on a first PRB over which the resource assignment is received or a first PRB corresponding to the downlink resource assignment. The retransmission feedback resource assignment can correspond to an index of one or more CCEs in a control channel region which the device 802 can use to communicate the feedback. This may result in an overlap of possible assigned retransmission feedback resources among legacy devices and devices using the enhanced control channel (e.g., where the CCE index and PRB index are the same, and thus result in the same CCE index for the retransmission feedback resources).

In one example, the overlap can be allowed, and the resource assigning component 812 can determine resources to assign to device 802 and/or resources over which to communicate the assignment so that related PRB indices do not overlap CCE indices used to assign resources to legacy devices. In one example, to ensure complete overlap such to determine the resources, resource assigning component 812 can compute modified PRB indices for determining whether to use or assign resources related to the PRBs as mod(PRB index, N_CCE), where N_CCE is the total number of CCEs used to assign control resources to legacy devices.

In another example, the overlap in possible assigned retransmission feedback resources can be flexible or non-existent. In one example, retransmission resource determining components 808 and 814 can determine the retransmission feedback resources based on one or more functions using an index. For example, base station 804 can determine retransmission feedback resources for legacy devices as a function of an offset, N_PUCCH, and the CCE index. In this example, retransmission resource determining components 808 and 814 can determine retransmission feedback resources for device 802 based on the downlink resource assignment in the enhanced control channel as a function of another offset, M_PUCCH, and the PRB index, which can be the first PRB index over which the downlink resource assignment is received or the first PRB index of the downlink resource assignment. For example, the offset M_PUCCH can be individually used to determine retransmission feedback resources for device 802 based on the downlink resource assignment in the enhanced control channel. Alternatively, the offset M_PUCCH can be combined with N_PUCCH to determine retransmission feedback resources for device 802 based on the downlink resource assignment in the enhanced control channel.

In one example, as described further herein, the offsets N_PUCCH and M_PUCCH can be defined to provide distinct non-overlapping regions of retransmission feedback resources for legacy devices and devices using the enhanced control channel. For instance, CCE numbering can be joint for the legacy control channel region and the enhanced control channel region (e.g., the numbering can be contiguous over the regions). In one example, the offset M_PUCCH can be common to all devices 802 using the enhanced control channel, and can thus be signaled or hardcoded in the devices, received in a layer 3 signaling, or in a configuration for the devices (e.g., as part of an initial connection to the network), and/or the like. In another example, the offset M_PUCCH may be UE-specific, e.g., each UE may receive an indication of M_PUCCH via dedicated signaling. The regions can be defined as a collection of CCEs, and the different regions for the different control channels can be contiguous, in one example.

Moreover, for example, since legacy control region can be conditioned on PCFICH, the total number of CCEs available for legacy downlink control channel, N_CCE, and the corresponding legacy control region of retransmission feedback resources can vary across subframes. To provide non-overlapping regions of retransmission feedback resources, in one example, the region for devices using the enhanced control channel can be defined before the legacy control region (otherwise the region for enhanced control channel devices would also be dependent on PCFICH). In this example, to avoid disrupting CCE numbering in the legacy control region, CCE indices for the region related to the enhanced control channel can be counted backwards from zero, such that the first CCE index in the region is −M_CCE, where M_CCE is the number of CCEs in the region, and the last CCE index is −1. Then, in the legacy region, the first CCE index is 0, and the last CCE index is N_CCE−1. For example, the indices can be applied by the device 802 and base station 804 to specified resources to identify the resources.

In another example, enhanced PCFICH (e-PCFICH) can be supported, in which case the offset M_PUCCH can be dependent on e-PCFICH and/or PCFICH. In yet another example, the offset M_PUCCH can be subframe dependent (e.g., where e-PDCCH is subframe dependent or otherwise). For example, the M_PUCCH can be based in part on a number of downlink resources assigned by base station 804 in the subframe. In any case, retransmission resource determining components 808 and 814 can be implemented or otherwise configured to similarly determine retransmission feedback resources according to one or more of the above examples based on a first PRB over which the downlink resource assignment is received over the enhanced control channel, the first PRB of the downlink resource assignment, etc. In one example, information regarding determining the resources can be signaled from the retransmission resource determining component 814 to device 802 (e.g., such as offset M_PUCCH, whether a first PRB index over which the downlink resource assignment is received, a first PRB of the downlink resource assignment is to be used, and/or the like).

In one example, resource assigning component 812 can compute modified PRB indices for determining the retransmission resources for the enhanced control channel. The modified PRB index can be based a first PRB index over which the downlink resource assignment is received, a first PRB of the downlink resource assignment is to be used, and/or the like. As an example, the modified PRB index can be mod(PRB index, N_CCE), where N_CCE is the total number of CCEs used to assign control resources to legacy devices.

In one example, resource assigning component 812 can further use additional parameters for determining the retransmission resources for the enhanced control channel. For example, an antenna port index related to the downlink resource assignment (e.g., an antenna port for e-PDCCH, an antenna port for PDSCH, etc.) can be further used, in combination with a CCE index or a PRB index to determine the retransmission resources. For another example, a rank index used to transmit the downlink resource assignment can be further used, in combination with a CCE index or a PRB index to determine the retransmission resources. As an example, resource assigning component 812 can further use a scrambling identifier related to the downlink resource assignment (e.g., in combination with a CCE index or a PRB index) to determine the retransmission resource.

In another example, retransmission resource determining component 814 can select resources for device 802 to transmit retransmission feedback, and can configure the resources for the device 802 and indicate the configured resources over layer 3 (e.g., RRC) signaling. In this example, retransmission resource determining component 808 can determine the retransmission feedback resources based on the layer 3 signaling. In one specific example, retransmission resource determining component 814 can configure $2^n$ possible resources, which can be known or otherwise indicated to the device 802, and can communicate a n-bit indicator to the device 802 that specifies which retransmission feedback resources the device is to use, where n is a positive integer. Thus, in this example, retransmission resource determining component 808 can receive the n-bit indicator to determine which of the $2^n$ resources to use for retransmission feedback.

The n-bit indicator can be newly introduced in a downlink control information (DCI) format and/or by re-interpreting some existing information fields in a DCI format, for example.

In another example, localized e-PDCCH and distributed e-PDCCH may be supported in a cell. A device, such as device 802, may be configured to monitor localized e-PDCCH, distributed e-PDCCH, or both. Localized e-PDCCH may be associated with a closed-loop precoding operation. In addition, a related resource may be localized in a certain region (e.g., within a PRB pair). Distributed e-PDCCH may be associated with transmit diversity based transmission or open loop beamforming based transmission. In addition, a related resource may be distributed in a certain bandwidth. Thus, if CCE index is used to derive ACK/NACK resource, resource assignment receiving component 806 may further receive a RRC configuration to help determine how to jointly handle ACK/NACK resource for downlink scheduling via both localized e-PDCCH and/or distributed e-PDCCH. As an example, an indicated total number of CCEs associated with distributed e-PDCCH or an offset can be received. For distributed e-PDCCH, the retransmission resource determining component 808 may derive ACK/NACK resource based on a CCE index of the corresponding e-PDCCH. For localized e-PDCCH, the retransmission resource determining component 808 may derive ACK/NACK resource based on a CCE index of the corresponding e-PDCCH and further, the indicated total number of CCEs associated with distributed e-PDCCH or the indicated offset. In this example, ACK/NACK resource for distributed e-PDCCH is placed first before ACK/NACK resource for localized e-PDCCH using PUCCH. Similar design can be done by placing ACK/NACK resource for localized e-PDCCH first (before for distributed e-PDCCH). Alternatively, the retransmission resource determining component 808 may implicitly derive an offset based on the signaled resource for distributed and/or localized e-PDCCH and use the offset for PUCCH ACK/NACK derivation. The numbering of CCEs for distributed and localized e-PDCCH can be consecutive, or further depending on an offset.

In another example, a UE may decode a channel indicating the size and/or location of at least one of localized ePDCCH and distributed ePDCCH. As an example, an enhanced physical control format indication (ePCFICH) may be introduced. ACK/NACK resource for ePDCCH can further be dependent on the indication. As an example, a 2-bit ePCFICH may be transmitted, and four different offsets may be used to determine ACK/NACK resource for ePDCCH based on the indicated ePCFICH value. The four different offsets may be explicitly configured by RRC or implicitly derived based on the configured distributed and/or localized ePDCCH resource.

In another example, PRB index based ACK/NACK resource derivation can also apply to legacy PDCCH based downlink transmissions. This can facilitate the management of ACK/NACK resource for both legacy PDCCH and ePDCCH based downlink transmissions.

Figure 9:
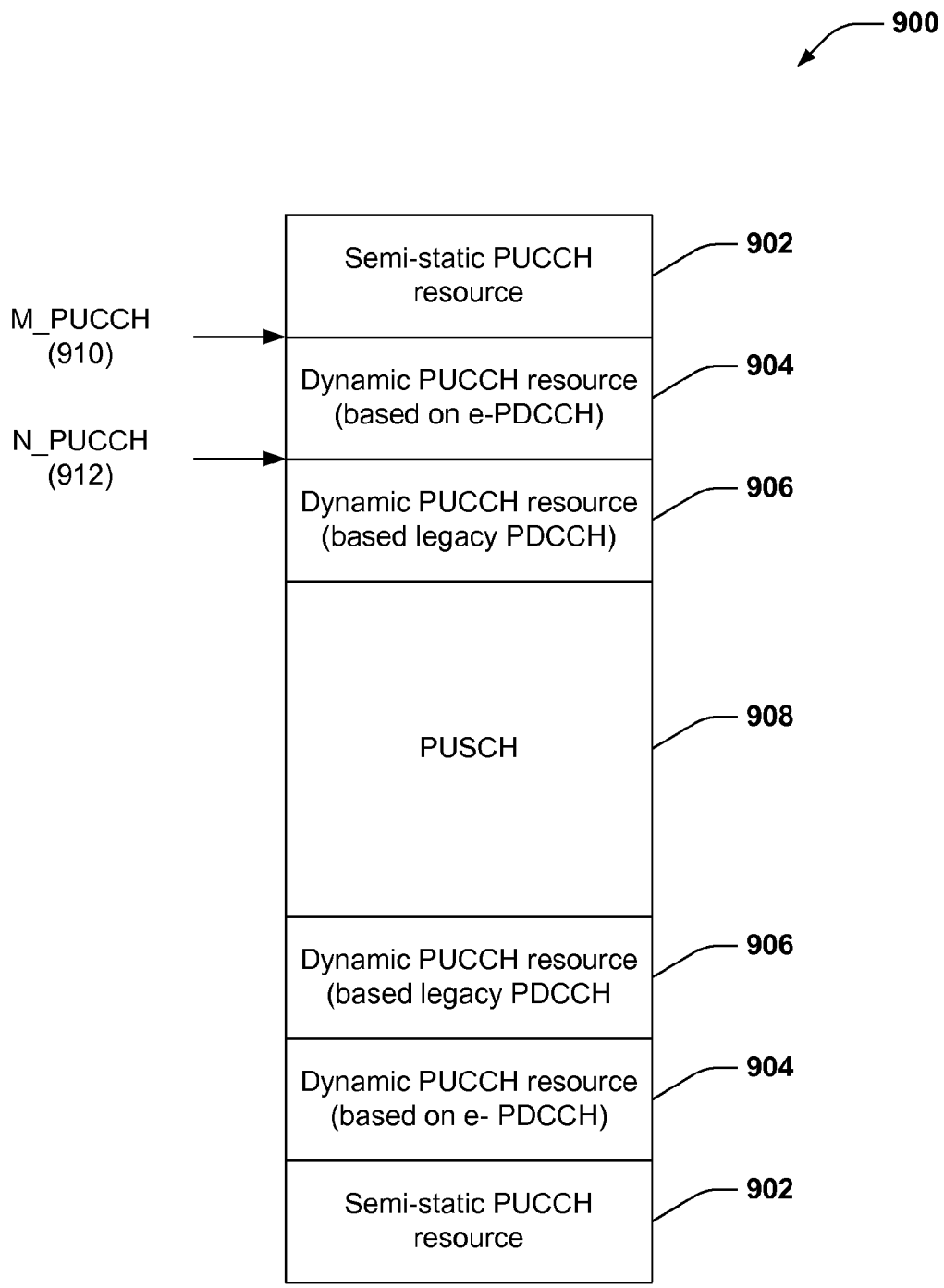
FIG. 9 is a block diagram of resource allocations for uplink control channel resources.

In one example, a UE may be configured with one or more ePDCCH resource sets, where each ePDCCH resource set may have a size individually configured. eCCE (enhanced control channel element) is indexed per ePDCCH resource set, and the lowest eCCE index of the corresponding ePDCCH is a component of PUCCH resource determination. Further, a UE can be configured with a semi-static PUCCH resource starting offset for each ePDCCH set. In TDD systems, multiple downlink subframes may be mapped to the same uplink subframe for PUCCH resource management. In order to avoid PUCCH ACK/NACK resource collisions, the eCCE indexing can be numbered jointly across different subframes associated with the same uplink subframe in the same ePDCCH set. As an example, assuming that the size of the downlink subframe association set is M=2 for an uplink subframe in TDD, and two ePDCCH sets are configured for a UE, the eCCE indexing can be done as follows in a consecutive and sequential manner:

ePDCCH set 1, with a total number of $N_{eCCE,1}$ eCCEs
m=1, $\{0, 1, \ldots, N_{eccE,1}-1\}$
m=2, $\{N_{eCCE,1}, N_{eCCE,1}+1, \ldots, 2*N_{eCCE,1}-1\}$
ePDCCH set 2, with a total number of $N_{eCCE,2}$ eCCEs
m=1, $\{0, 1, \ldots, N_{eccE,2}-1\}$
m=2, $\{N_{eCCE,2}, N_{eCCE,2}+1, \ldots, 2*N_{eCCE,2}-1\}$ FIG. 9 illustrates an example resource allocation 900 for uplink control channel resources. For example, resource allocation 900 can represent a number of frequency resources over time. In this example, resource allocation 900 can comprise semi-static PUCCH resource regions 902 for communicating control data such as channel state information feedback, scheduling request, ACK/NACK in response to semi-persistently scheduled downlink data, and/or similar semi-static control data. These regions 902 can occupy a certain number of resources, such that a known or otherwise received offset can be used to determine a start of one or more other regions. For example, inside of the semi-static PUCCH resource regions 902, in this example, are dynamic PUCCH resource regions 904 for the enhanced control channel, followed by dynamic PUCCH resource regions 906 for the legacy control channel. The resource allocation also includes a region 908 for PUSCH allocation.

The depicted resource allocation 900 illustrates concepts described above, for example, where the dynamic PUCCH resource region 904 for the enhanced control channel can be determined based on an offset M_PUCCH 910, and the dynamic PUCCH resource region 906 for the legacy control channel can be determined from offset N_PUCCH 912. As described, the offsets M_PUCCH 910 and/or N_PUCCH 912 can be communicated to a device from a serving base station to locate an associated retransmission feedback resource region for determining resources over which to communicate feedback for a downlink resource assignment. Additionally or alternatively, the resources (e.g., CCEs) of the dynamic PUCCH resource region 904 and the dynamic PUCCH resource region 906 can be contiguously indexed.

For example, so as not to disrupt counting in the region 906 for the legacy control channel, the region 904 can be index backwards from zero to the number of CCEs in the region 904. Thus, for example, the contiguous numbering over the regions 904 and 906 can follow a format similar to the following: –M_CCE, –(M_CCE–1), . . . , –1, 0, 1, . . . , N_CCE, where M_CCE is the number of CCEs in region 904, and N_CCE is the number of CCEs in region 906. In this example, a device and/or base station can compute resources to use for retransmission feedback based on a function of the M_PUCCH or N_PUCCH offset (depending on whether the device uses the enhanced control channel or legacy control channel) and/or an index of the first PRB over which the downlink resource assignment is received or a first PRB in the downlink resource assignment. The function can provide the CCE index of the resources to use for retransmission feedback according to the above numbering.

Figure 10:
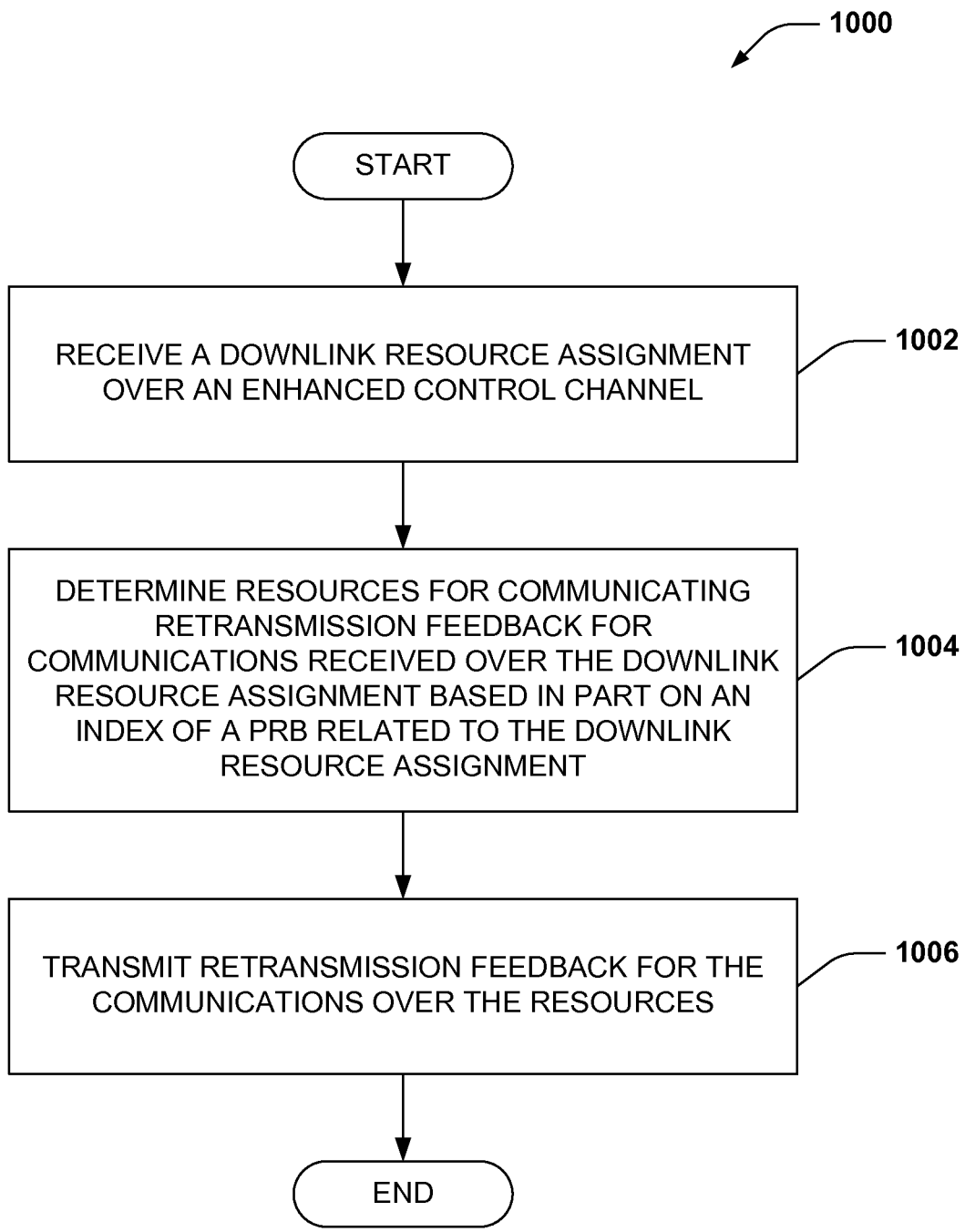
FIG. 10 is a flowchart of a methodology, e.g., implementable by an UE, for determining resources for communicating retransmission feedback through use of an enhanced control channel.
Figure 11:
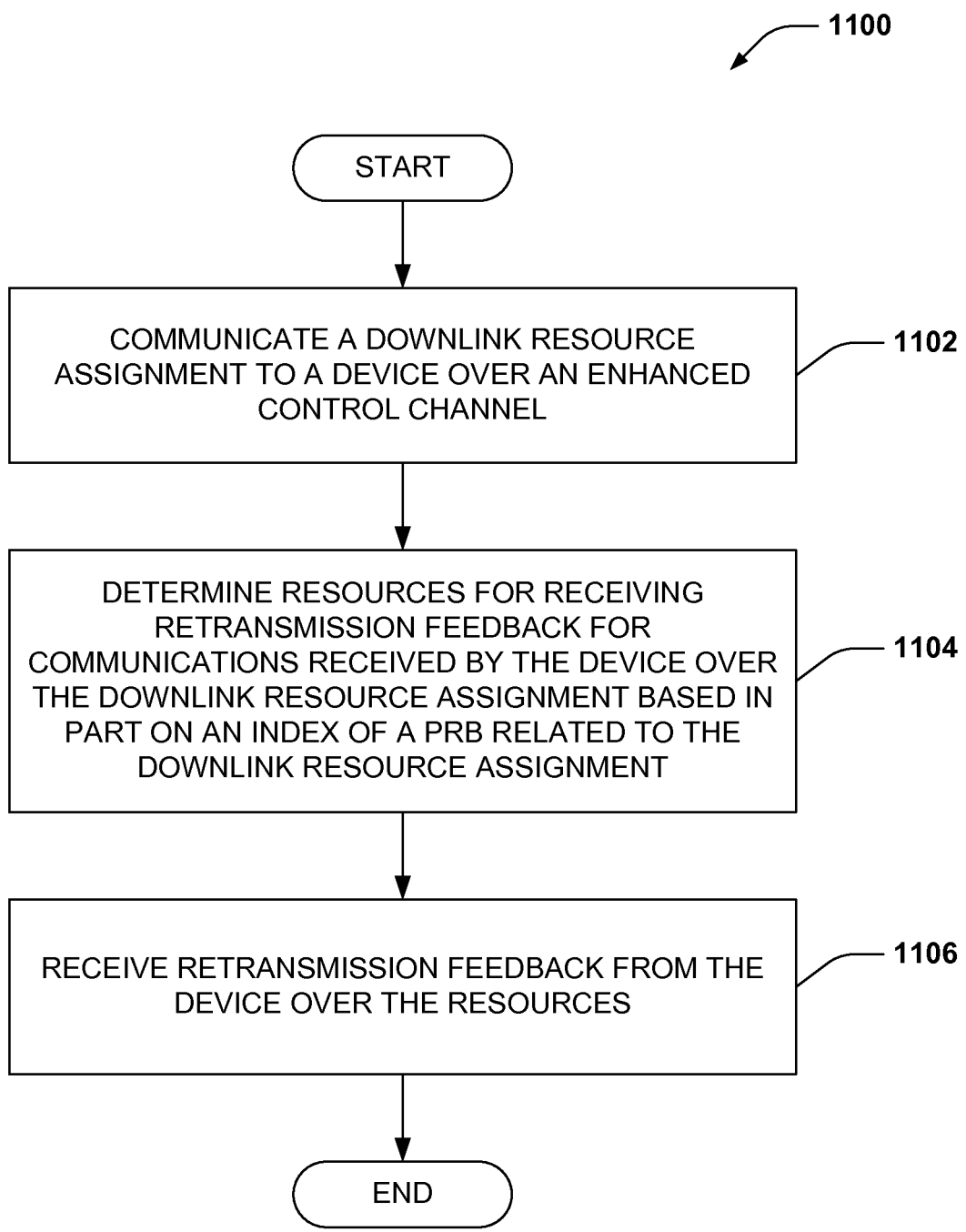
FIG. 11 is a flowchart of a methodology, e.g., implementable by an eNB, for determining resources for receiving retransmission feedback through use of an enhanced control channel.

FIGS. 10-11 illustrate example methodologies relating to determining resources for retransmission feedback based on an enhanced control channel. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 10 illustrates an example methodology 1000 for determining resources for communicating retransmission feedback.

At 1002, a downlink resource assignment can be received over an enhanced control channel. For example, the downlink resource assignment can be received from a base station, and the enhanced control channel can be defined as described to include TDM or FDM resources in a legacy data region of a subframe, and/or the like. The downlink resource assignment can be received over one or more PRBs and can indicate one or more PRBs over which to expect data communications from the base station.

At 1004, resources for communicating retransmission feedback for communications received over the downlink resource assignment can be determined based in part on an index of a PRB related to the downlink resource assignment. For example, the resources can be determined based on an index of the first PRB over which the downlink resource assignment is received, an index of the first PRB of the downlink resource assignment, and/or the like, as described. For example, determining the resources can be based on a function of the index of the PRB, which can provide an index of a CCE over which to communicate retransmission feedback for communications received over the resources in the downlink resource assignment. In addition, for example, an offset can be received from which the CCE index can be computed, and the function can further utilize the offset in computing the CCE index. The offset can correspond to an offset of a region of CCEs reserved for retransmission feedback for downlink resource assignments transmitted over an enhanced control channel, as opposed to resource assignments transmitted over a legacy control channel, as described.

At 1006, retransmission feedback can be transmitted for the communications over the resources. For example, the determined CCE index can correspond to one or more resources in a region. In the case of the enhanced control channel, as described, the determined CCE index can be a negative value. The retransmission feedback transmitted, as described, can be an ACK, NACK, or similar feedback related to whether communications received over the resources of the downlink resource assignment should be retransmitted.

FIG. 11 illustrates an example methodology 1100 for determining resources for communicating retransmission feedback.

At 1102, a downlink resource assignment can be communicated to a device over an enhanced control channel. For example, the enhanced control channel can be defined as described to include TDM or FDM resources in a legacy data region of a subframe, and/or the like. The downlink resource assignment can be communicated over one or more PRBs and can indicate one or more PRBs over which to expect data communications from the base station.

At 1104, resources for receiving retransmission feedback for communications received by the device over the downlink resource assignment can be determined based in part on an index of a PRB related to the downlink resource assignment. For example, the resources can be determined based on an index of the first PRB over which the downlink resource assignment is communicated to the device, an index of the first PRB of the downlink resource assignment, and/or the like, as described. For example, determining the resources can be based on a function of the index of the PRB, which can provide an index of a CCE over which to receive retransmission feedback for communications received by the device over the resources in the downlink resource assignment. In addition, for example, an offset can be received from which the CCE index can be computed, and the function can further utilize the offset in computing the CCE index. The offset can correspond to an offset of a region of CCEs reserved for retransmission feedback for downlink resource assignments transmitted over an enhanced control channel, as opposed to resource assignments transmitted over a legacy control channel, as described.

At 1106, retransmission feedback can be received from the device over the resources. For example, the determined CCE index can correspond to one or more resources in a region. In the case of the enhanced control channel, as described, the determined CCE index can be a negative value. The retransmission feedback received, as described, can be an ACK, NACK, or similar feedback related to whether communications received over the resources of the downlink resource assignment should be retransmitted.

It will be appreciated that, in accordance with one or more aspects described herein, inferences can be made regarding determining resources for retransmission feedback, determining a region for such resources, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
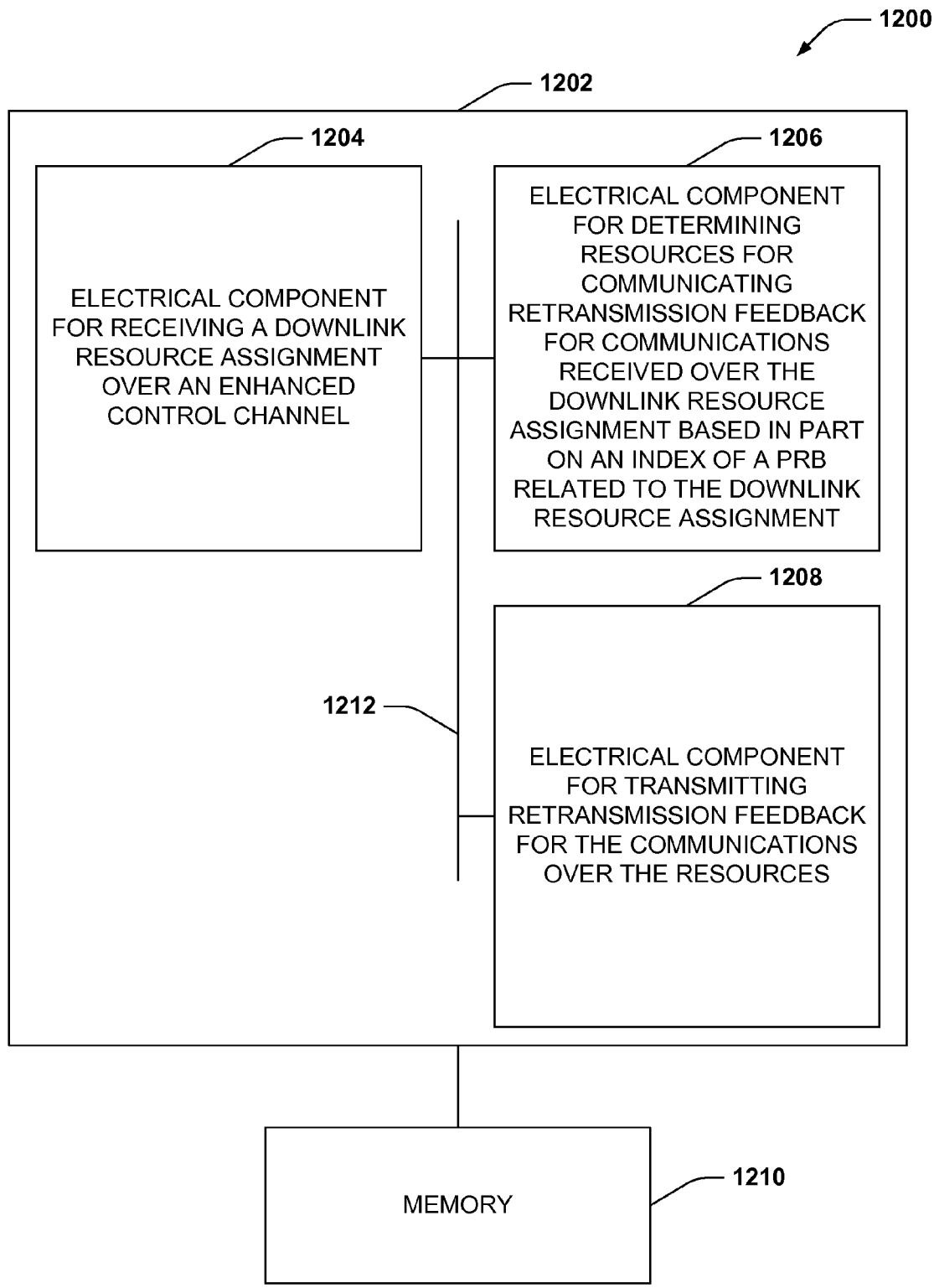
FIG. 12 is a block diagram of an apparatus that determines resources for communicating retransmission feedback through use of an enhanced control channel.

With reference to FIG. 12, illustrated is an apparatus 1200 including various modules/means/components for determining resources for communicating retransmission feedback. The apparatus may be a UE. It is to be appreciated that the apparatus 1200 is represented as including functional blocks, which can be functional blocks that represent functions implemented by a processor, software/firmware, or combinations thereof. The apparatus 1200 includes a logical grouping 1202 of components (e.g., electrical components) that can act in conjunction. For instance, logical grouping 1202 can include an electrical component for receiving a downlink resource assignment over an enhanced control channel 1204. For example, the downlink resource assignment can specify one or more PRBs over which to receive communications from the base station.

Further, logical grouping 1202 can comprise an electrical component for determining resources for communicating retransmission feedback for communications received over the downlink resource assignment based in part on an index of a PRB related to the downlink resource assignment 1206. As described, in an example, the index can include an index of a first PRB over which the downlink resource assignment is received, an index of a first PRB in the downlink resource assignment, etc. Moreover, logical grouping 1202 can include an electrical component for transmitting retransmission feedback for the communications over the resources 1208.

For example, electrical component 1204 can include a resource assignment receiving component 806, as described above. In addition, for example, electrical component 1206, in an aspect, can include a retransmission resource determining component 808, as described above. Moreover, in an example, electrical component 1208 can include a retransmission feedback providing component 810.

Additionally, the apparatus 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210. Electrical components 1204, 1206, and 1208, in an example, can be interconnected/coupled over a bus 1212 or similar connection/coupling to allow communication among the components. In one example, electrical components 1204, 1206, and 1208 can comprise at least one processor, or each electrical component 1204, 1206, and 1208 can be a corresponding module of at least one processor, such as controller/processor 380. Moreover, in an additional or alternative example, components 1204, 1206, and 1208 can be a computer program product comprising a computer readable medium, where each component 1204, 1206, and 1208 can be corresponding code.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1200 for wireless communication includes means for means for receiving a downlink resource assignment over an enhanced control channel; means for determining resources for communicating retransmission feedback for communications received over the downlink resource assignment based in part on an index of a resource related to the downlink resource assignment; and means for transmitting retransmission feedback for the communications over the resources. The aforementioned means may be one or more of the aforementioned modules of the apparatus 1200 and/or a processing system of the apparatus 1200 configured to perform the functions recited by the aforementioned means. The processing system may include the transmit processor 364, the receive processor 358, and the controller/processor 380. As such, in one configuration, the aforementioned means may be the transmit processor 364, the receive processor 358, and/or the controller/processor 380 configured to perform the functions recited by the aforementioned means.

Figure 13:
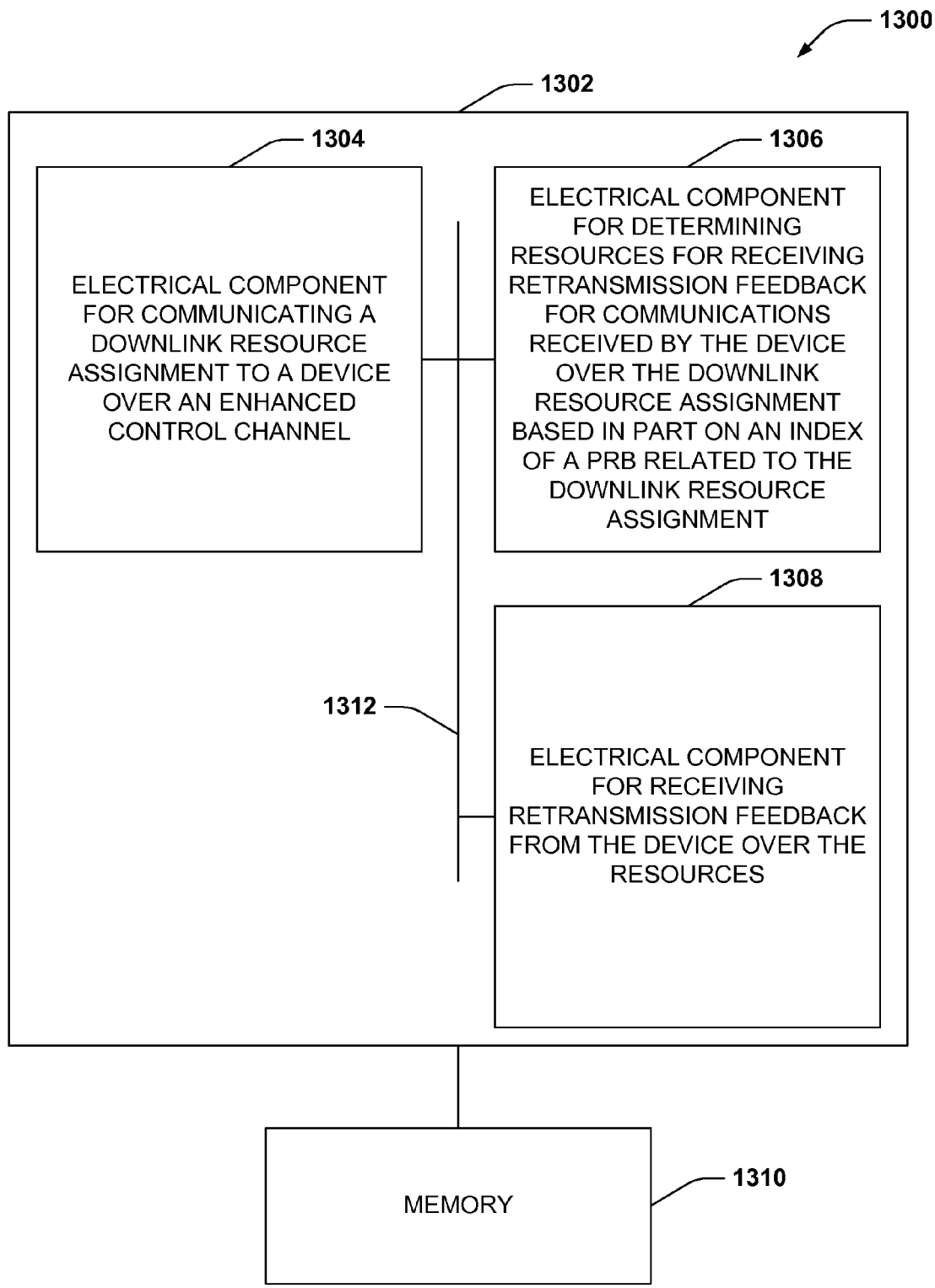
FIG. 13 is a block diagram an apparatus that determines resources for receiving retransmission feedback through use of an enhanced control channel.

With reference to FIG. 13, illustrated is an apparatus 1300 for determining resources for receiving retransmission feedback. The apparatus may be an eNB. It is to be appreciated that apparatus 1300 is represented as including functional blocks, which can be functional blocks that represent functions implemented by a processor, software/firmware, or combinations thereof. The apparatus 1300 includes a logical grouping 1302 of components (e.g., electrical components) that can act in conjunction. For instance, logical grouping 1302 can include an electrical component for communicating a downlink resource assignment to a device over an enhanced control channel 1304. For example, the downlink resource assignment can specify one or more PRBs over which communications can be received.

Further, logical grouping 1302 can comprise an electrical component for determining resources for receiving retransmission feedback for communications received by the device over the downlink resource assignment based in part on an index of a PRB related to the downlink resource assignment 1306. As described, in an example, the index can include an index of a first PRB over which the downlink resource assignment is transmitted, an index of a first PRB in the downlink resource assignment, etc. Moreover, logical grouping 1302 can include an electrical component for receiving retransmission feedback from the device over the resources 1308.

For example, electrical component 1304 can include a resource assigning component 812, as described above. In addition, for example, electrical component 1306, in an aspect, can include a retransmission resource determining component 814, as described above. Moreover, in an example, electrical component 1308 can include a retransmission feedback receiving component 816.

Additionally, the apparatus 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310. Electrical components 1304, 1306, and 1308, in an example, can be interconnected/coupled over a bus 1312 or similar connection/coupling to allow communication among the components. In one example, electrical components 1304, 1306, and 1308 can comprise at least one processor, or each electrical component 1304, 1306, and 1308 can be a corresponding module of at least one processor, such as controller/processor 340. Moreover, in an additional or alternative example, components 1304, 1306, and 1308 can be a computer program product comprising a computer readable medium, where each component 1304, 1306, and 1308 can be corresponding code.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1300 for wireless communication includes means for communicating a downlink resource assignment to a device over an enhanced control channel; means for determining resources for receiving retransmission feedback for communications received by the device over the downlink resource assignment based in part on an index of a resource related to the downlink resource assignment; and means for receiving retransmission feedback from the device over the resources. The aforementioned means may be one or more of the aforementioned modules of the apparatus 1300 and/or a processing system of the apparatus 1200 configured to perform the functions recited by the aforementioned means. The processing system may include the transmit processor 320, the receive processor 338, and the controller/processor 340. As such, in one configuration, the aforementioned means may be the transmit processor 320, the receive processor 338, and/or the controller/processor 320 configured to perform the functions recited by the aforementioned means.

Figure 14:
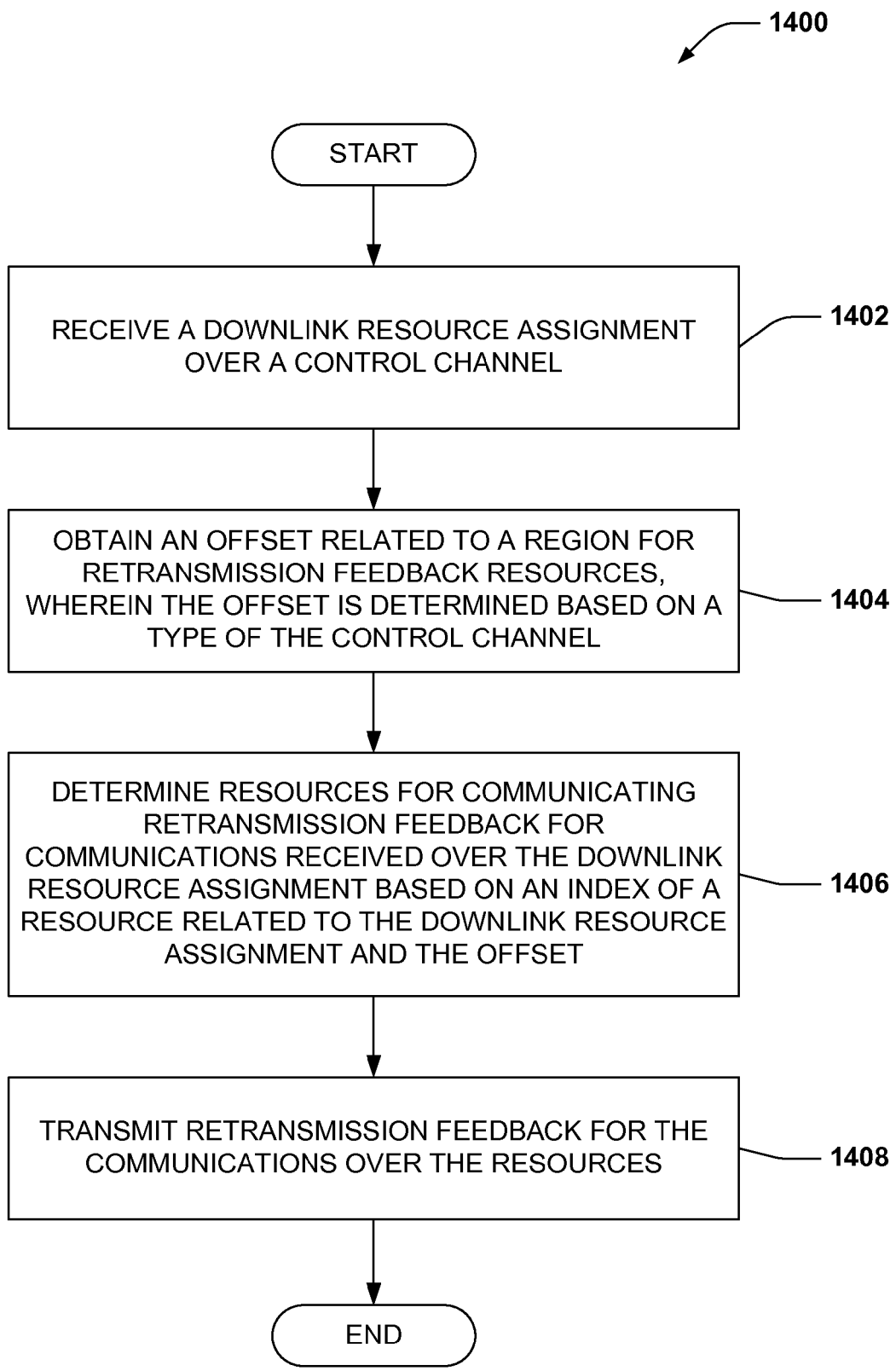
FIG. 14 is a flowchart of a methodology, e.g., implementable by an UE, for determining resources for communicating retransmission feedback through use of an index of a resource and an offset.
Figure 15:
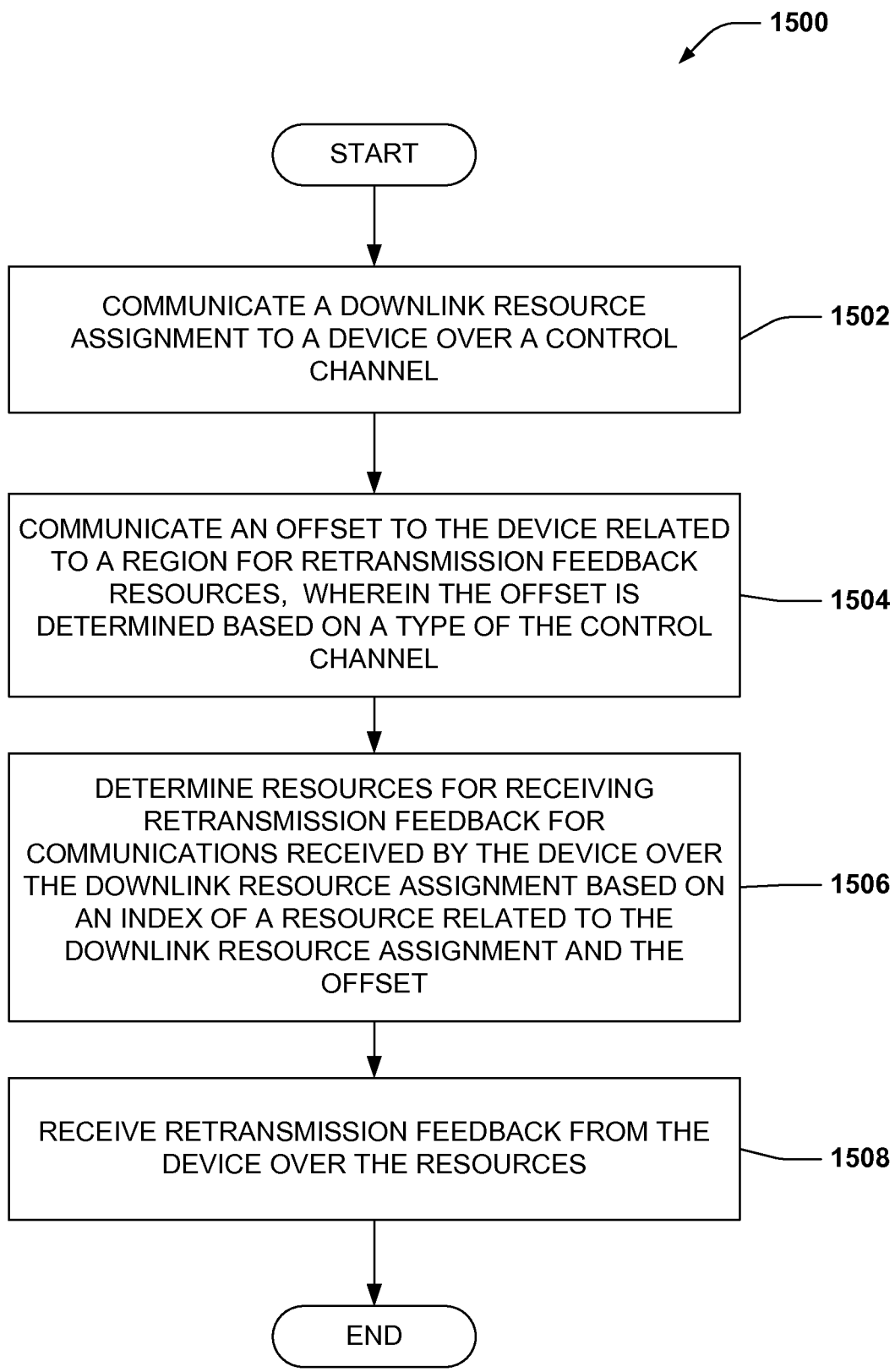
FIG. 15 is a flowchart of a methodology, e.g., implementable by an eNB, for determining resources for receiving retransmission feedback through use of an index of a resource and an offset.

FIGS. 14-15 illustrate example methodologies relating to determining resources for retransmission feedback based on an index received over a control channel and an offset. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 14 illustrates an example methodology 1400, e.g., implemented by a UE, for determining resources for communicating retransmission feedback based on an index received over a control channel and an offset that is determined based on a type of the control channel.

At 1402, a downlink resource assignment is received over a control channel. The downlink resource assignment may be received from a base station. In the case of an enhanced control channel the resource assignment may be defined as described above to include TDM or FDM resources in a legacy data region of a subframe, and/or the like. The downlink resource assignment can be received over one or more PRBs and can indicate one or more PRBs over which to expect data communications from the base station.

At 1404, an offset related to a region for retransmission feedback resources is obtained. The offset may be determined based on a type of the control channel. For example, as described above, in the case of a legacy control channel the offset may be N_PUCCH within a resource allocation, and in the case of an enhanced control channel the offset may be M_PUCCH within a resource allocation. Enhanced control channel offsets may be based on a unicast message, while legacy control channel offsets may be based on a broadcast message. As described above, an offset can be received from which a CCE index can be computed, and the function can further utilize the offset in computing the CCE index. The offset can correspond to an offset of a region of CCEs reserved for retransmission feedback for downlink resource assignments transmitted over an enhanced control channel, as opposed to resource assignments transmitted over a legacy control channel.

At 1406, resources for communicating retransmission feedback for communications received over the downlink resource assignment are determined based on an index of a resource related to the downlink resource assignment and the offset. If the type of the control channel is an enhanced physical downlink control channel (e-PDCCH), the index corresponds to one of an index over which the downlink resource assignment is received, or an index of the resource in the downlink resource assignment. In this case the index may be an enhanced control channel (eCCE) index, corresponding to a starting eCCE index utilized by the e-PDCCH. If the type of the control channel is a legacy physical downlink control channel (PDCCH), the index corresponds to one of an index over which the downlink resource assignment is received. For example, the index may be a control channel element (CCE) index corresponding to a starting CCE index utilized by the PDCCH.

At 1408, retransmission feedback is transmitted for the communications over the resources. The retransmission feedback transmitted, as described, can be an ACK, NACK, or similar feedback related to whether communications received over the resources of the downlink resource assignment should be retransmitted.

FIG. 15 illustrates an example methodology 1500, e.g., implemented by an eNB, for determining resources for communicating retransmission feedback based on an index received over a control channel and an offset that is determined based on a type of the control channel.

At 1502, a downlink resource assignment can be communicated to a device over a control channel. In the case of an enhanced control channel the resource assignment may be defined as described above to include TDM or FDM resources in a legacy data region of a subframe, and/or the like. The downlink resource assignment can be received over one or more PRBs and can indicate one or more PRBs over which to expect data communications from the base station.

At 1504, an offset related to a region for retransmission feedback resources is communicated to a device. The offset may be determined based on a type of the control channel. For example, as described above, in the case of a legacy control channel the offset may be N_PUCCH within a resource allocation, and in the case of an enhanced control channel the offset may be M_PUCCH within a resource allocation. Enhanced control channel offsets may be based on a unicast message, while legacy control channel offsets may be based on a broadcast message. As described above, an offset can be received from which a CCE index can be computed, and the function can further utilize the offset in computing the CCE index. The offset can correspond to an offset of a region of CCEs reserved for retransmission feedback for downlink resource assignments transmitted over an enhanced control channel, as opposed to resource assignments transmitted over a legacy control channel.

At 1506, resources for receiving retransmission feedback for communications received by the device over the downlink resource assignment are determined based on an index of a resource related to the downlink resource assignment and the offset. If the type of the control channel is an enhanced physical downlink control channel (e-PDCCH), the index corresponds to one of an index over which the downlink resource assignment is received, or an index of the resource in the downlink resource assignment. In this case the index may be an enhanced control channel (eCCE) index, corresponding to a starting eCCE index utilized by the e-PDCCH. If the type of the control channel is a legacy physical downlink control channel (PDCCH), the index corresponds to one of an index over which the downlink resource assignment is received. For example, the index may be a control channel element (CCE) index corresponding to a starting CCE index utilized by the PDCCH.

At 1508, retransmission feedback is received from the device over the resources. The retransmission feedback transmitted, as described, can be an ACK, NACK, or similar feedback related to whether communications received over the resources of the downlink resource assignment should be retransmitted.

It will be appreciated that, in accordance with one or more aspects described herein, inferences can be made regarding determining resources for retransmission feedback, determining a region for such resources, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 16:
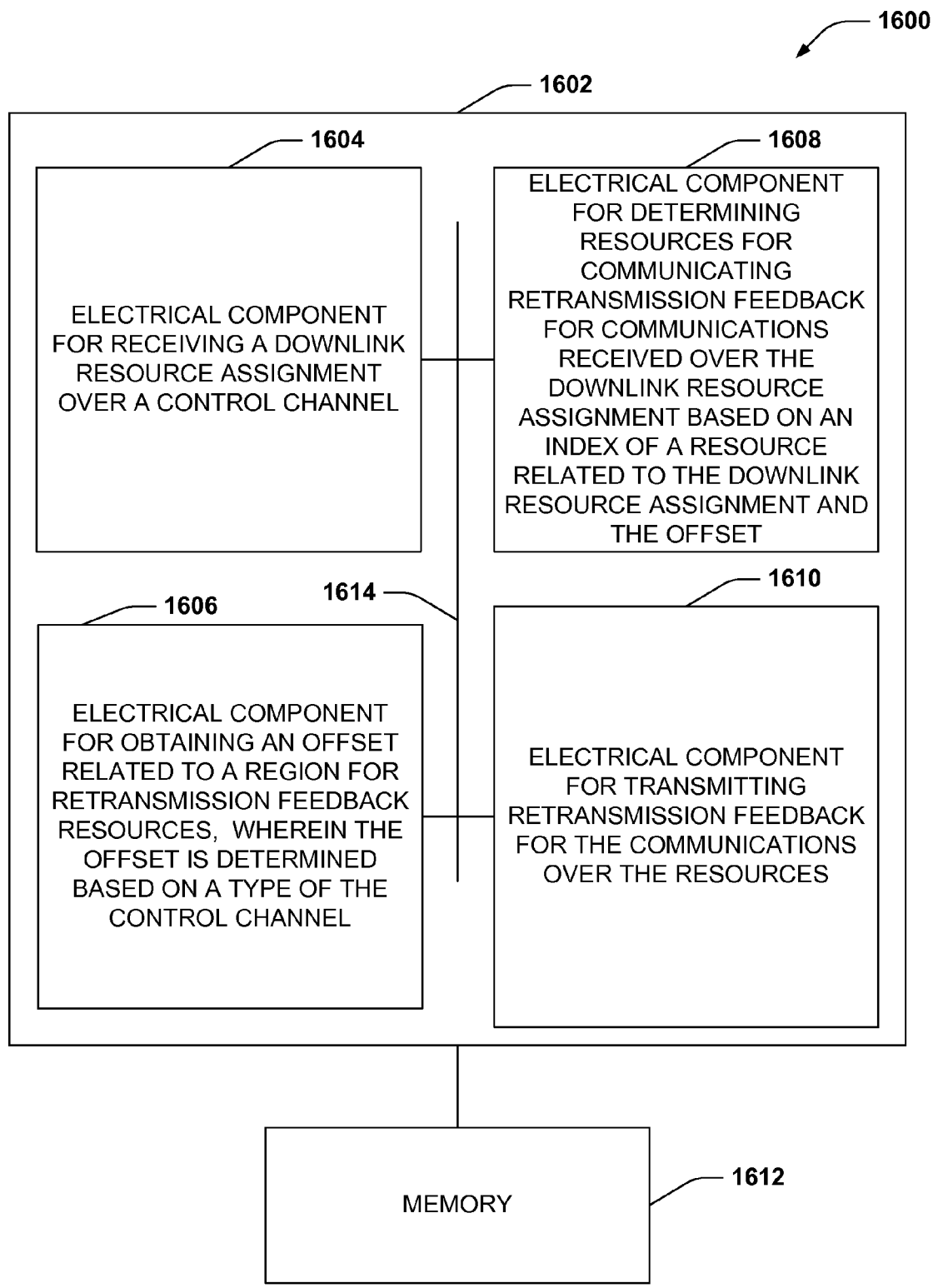
FIG. 16 is a block diagram of an apparatus that determines resources for communicating retransmission feedback through use of an index of a resource and an offset.

With reference to FIG. 16, illustrated is an apparatus 1600 including various modules/means/components for determining resources for communicating retransmission feedback. The apparatus may be a UE. It is to be appreciated that the apparatus 1600 is represented as including functional blocks, which can be functional blocks that represent functions implemented by a processor, software/firmware, or combinations thereof. The apparatus 1600 includes a logical grouping 1602 of components (e.g., electrical components) that can act in conjunction. For instance, logical grouping 1602 can include an electrical component for receiving a downlink resource assignment over a control channel 1604.

Further, logical grouping 1602 can comprise an electrical component for obtaining an offset related to a region for retransmission feedback resources, wherein the offset is determined based on a type of the control channel 1606. The logical grouping 1602 may also include an electrical component for determining resources for communicating retransmission feedback for communications received over the downlink resource assignment based on an index of a resource related to the downlink resource assignment and the offset 1608. Moreover, logical grouping 1602 can include an electrical component for transmitting retransmission feedback for the communications over the resources 1610.

Additionally, the apparatus 1600 can include a memory 1612 that retains instructions for executing functions associated with the electrical components 1604, 1606, 1608 and 1610. While shown as being external to memory 1612, it is to be understood that one or more of the electrical components 1604, 1606, 1608 and 1610 can exist within memory 1612. Electrical components 1604, 1606, 1608 and 1610, in an example, can be interconnected/coupled over a bus 1614 or similar connection/coupling to allow communication among the components. In one example, electrical components 1604, 1606, 1608 and 1610 can comprise at least one processor, or each electrical component 1604, 1606, 1608 and 1610 can be a corresponding module of at least one processor, such as controller/processor 380. Moreover, in an additional or alternative example, components 1604, 1606, 1608 and 1610 can be a computer program product comprising a computer readable medium, where each component 1604, 1606, 1608 and 1610 can be corresponding code.

The apparatus 1600 may include additional modules that perform each of the steps of the algorithm in the aforementioned flow chart of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1600 for wireless communication includes means for receiving a downlink resource assignment over a control channel, and means for obtaining an offset related to a region for retransmission feedback resources, wherein the offset is determined based on a type of the control channel. The apparatus 1600 also includes means for determining resources for communicating retransmission feedback for communications received over the downlink resource assignment based on an index of a resource related to the downlink resource assignment and the offset, and means for transmitting retransmission feedback for the communications over the resources.

The apparatus 1600 may also include means for determining the resources based at least in part on a scrambling identifier related to the downlink resource assignment, means for receiving information related to a location of a region comprising the resources over at least one of a physical control format indication channel (PCFICH), or an enhanced physical control format indication channel (e-PCFICH), wherein the offset is dependent on the PCFICH or the e-PCFICH, and means for modifying the index based on a total number of available resources for retransmission feedback.

The aforementioned means may be one or more of the aforementioned modules of the apparatus 1600 and/or a processing system of the apparatus 1600 configured to perform the functions recited by the aforementioned means. The processing system may include the transmit processor 364, the receive processor 358, and the controller/processor 380. As such, in one configuration, the aforementioned means may be the transmit processor 364, the receive processor 358, and/or the controller/processor 380 configured to perform the functions recited by the aforementioned means.

Figure 17:
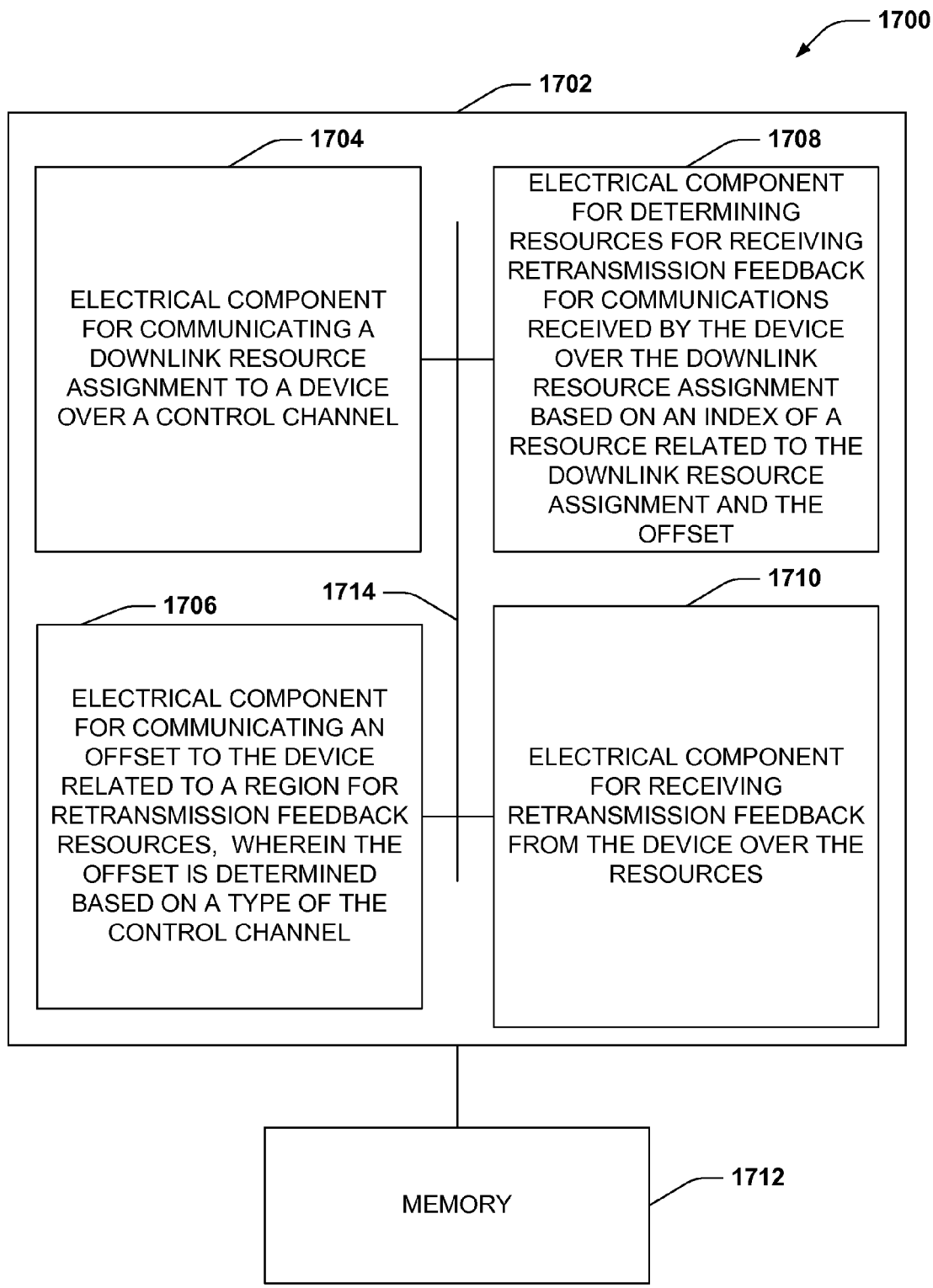
FIG. 17 is a block diagram an apparatus that determines resources for receiving retransmission feedback through use of an index of a resource and an offset.

With reference to FIG. 17, illustrated is an apparatus 1700 for determining resources for receiving retransmission feedback. The apparatus may be an eNB. It is to be appreciated that apparatus 1700 is represented as including functional blocks, which can be functional blocks that represent functions implemented by a processor, software/firmware, or combinations thereof. The apparatus 1700 includes a logical grouping 1702 of components (e.g., electrical components) that can act in conjunction. For instance, logical grouping 1702 can include an electrical component for communicating a downlink resource assignment to a device over a control channel 1704.

Further, logical grouping 1702 may include an electrical component for communicating an offset to the device related to a region for retransmission feedback resources, wherein the offset is determined based on a type of the control channel 1706. Logical grouping may also include an electrical component for determining resources for receiving retransmission feedback for communications received by the device over the downlink resource assignment based on an index of a resource assignment and the offset 1708. Moreover, logical grouping 1702 may include an electrical component for receiving retransmission feedback from the device over the resources 1710.

Additionally, the apparatus 1700 can include a memory 1712 that retains instructions for executing functions associated with the electrical components 1704, 1706, 1708 and 1710. While shown as being external to memory 1712, it is to be understood that one or more of the electrical components 1704, 1706, 1708 and 1710 can exist within memory 1712. Electrical components 1704, 1706, 1708 and 1710, in an example, can be interconnected/coupled over a bus 1714 or similar connection/coupling to allow communication among the components. In one example, electrical components 1704, 1706, 1708 and 1710 can comprise at least one processor, or each electrical component 1704, 1706, 1708 and 1710 can be a corresponding module of at least one processor, such as controller/processor 340. Moreover, in an additional or alternative example, components 1704, 1706, 1708 and 1710 can be a computer program product comprising a computer readable medium, where each component 1704, 1706, 1708 and 1710 can be corresponding code.

The apparatus may include additional modules that perform each of the steps of the algorithm in the aforementioned flow chart of FIG. 15. As such, each step in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1700 for wireless communication includes means for communicating a downlink resource assignment to a device over a control channel, and means for communicating an offset to the device related to a region for retransmission feedback resources, wherein the offset is determined based on a type of the control channel. The apparatus 1700 also includes means for determining resources for receiving retransmission feedback for communications received by the device over the downlink resource assignment based on an index of a resource related to the downlink resource assignment and the offset, and means for receiving retransmission feedback from the device over the resources.

The apparatus 1700 may also include means for determining the resources based at least in part on a scrambling identifier related to the downlink resource assignment, and means for communicating information related to a location of a region comprising the resources over at least one of a physical control format indication channel (PCFICH), or an enhanced physical control format indication channel (e-PCFICH), wherein the offset is dependent on the PCFICH or the e-PCFICH. The apparatus 1700 may also include means for modifying the index based on a total number of available resources for retransmission feedback.

The aforementioned means may be one or more of the aforementioned modules of the apparatus 1700 and/or a processing system of the apparatus 1700 configured to perform the functions recited by the aforementioned means. The processing system may include the transmit processor 320, the receive processor 338, and the controller/processor 340. As such, in one configuration, the aforementioned means may be the transmit processor 320, the receive processor 338, and/or the controller/processor 340 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in combinations thereof. A software/firmware module may reside in RAM memory, flash memory, PCM (phase change memory), ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for determining retransmission feedback resources, comprising:
   receiving a downlink resource assignment over a physical control channel;
   obtaining an offset related to a region for retransmission feedback resources, wherein the offset is determined based on a type of the physical control channel;
   determining resources for communicating retransmission feedback for communications received over the downlink resource assignment based on an index of a resource related to the downlink resource assignment and the offset; and
   transmitting retransmission feedback for the communications over the resources.

2. The method of claim 1, wherein the type of the control channel is an enhanced physical downlink control channel (e-PDCCH), and the index corresponds to one of an index over which the downlink resource assignment is received, or an index of the resource in the downlink resource assignment.

3. The method of claim 2, wherein the index is an enhanced control channel (eCCE) index, corresponding to a starting eCCE index utilized by the e-PDCCH.

4. The method of claim 3, further comprising indexing eCCEs, wherein the indexing of eCCEs is performed over two or more downlink subframes in a sequential manner where the two or more downlink subframes are associated with a same uplink subframe for retransmission feedback.

5. The method of claim 4, further comprising receiving two or more sets of resources for ePDCCH, wherein the indexing is performed separately for each of the two or more sets.

6. The method of claim 3, wherein the offset is determined based on a unicast message.

7. The method of claim 2, wherein the e-PDCCH is at least one of a distributed e-PDCCH or a localized e-PDCCH.

8. The method of claim 2, wherein determining resources is further based in part on an antenna port index used by the ePDCCH.

9. The method of claim 2, further comprising determining the resources based at least in part on a scrambling identifier related to the downlink resource assignment.

10. The method of claim 1, wherein the type of the control channel is a legacy physical downlink control channel (PDCCH), and the index corresponds to one of an index over which the downlink resource assignment is received.

11. The method of claim 10, wherein the index is a control channel element (CCE) index corresponding to a starting CCE index utilized by the PDCCH.

12. The method of claim 10, wherein the offset is determined based on a broadcast message.

13. The method of claim 1, further comprising receiving information related to a location of a region comprising the resources over at least one of a physical control format indication channel (PCFICH), or an enhanced physical control format indication channel (e-PCFICH), wherein the offset is dependent on the PCFICH or the e-PCFICH.

14. The method of claim 1, wherein the offset is based in part on a number of downlink resources assigned in a subframe.

15. The method of claim 1, wherein determining resources comprises determining a plurality of resources, and further comprises:
   obtaining an indicator in an enhanced physical downlink control channel (e-PDCCH); and
   selecting one of the plurality of resources based on the indicator.

16. The method of claim 15, wherein the plurality of resources are configured by radio resource control (RRC).

17. The method of claim 1, further comprising modifying the index based on a total number of available resources for retransmission feedback.

18. An apparatus for determining retransmission feedback resources, comprising:
   means for receiving a downlink resource assignment over a physical control channel;
   means for obtaining an offset related to a region for retransmission feedback resources, wherein the offset is determined based on a type of the physical control channel;
   means for determining resources for communicating retransmission feedback for communications received over the downlink resource assignment based on an index of a resource related to the downlink resource assignment and the offset; and
   means for transmitting retransmission feedback for the communications over the resources.

19. The apparatus of claim 18, wherein the type of the control channel is an enhanced physical downlink control channel (e-PDCCH), and the index corresponds to one of an index over which the downlink resource assignment is received, or an index of the resource in the downlink resource assignment.

20. The apparatus of claim 19 wherein the index is an enhanced control channel (eCCE) index, corresponding to a starting eCCE index utilized by the e-PDCCH.

21. The apparatus of claim 20, further comprising means for indexing eCCEs, wherein the indexing of eCCEs is performed over two or more downlink subframes in a sequential manner where the two or more downlink subframes are associated with a same uplink subframe for retransmission feedback.

22. The apparatus of claim 21, further comprising means for receiving two or more sets of resources for ePDCCH, wherein the indexing is performed separately for each of the two or more sets.

23. The apparatus of claim 20, wherein the offset is determined based on a unicast message.

24. The apparatus of claim 19, wherein the e-PDCCH is at least one of a distributed e-PDCCH or a localized e-PDCCH.

25. The apparatus of claim 19, wherein determining resources is further based in part on an antenna port index used by the ePDCCH.

26. The apparatus of claim 19, further comprising means for determining the resources based at least in part on a scrambling identifier related to the downlink resource assignment.

27. The apparatus of claim 18, wherein the type of the control channel is a legacy physical downlink control channel (PDCCH), and the index corresponds to one of an index over which the downlink resource assignment is received.

28. The apparatus of claim 27, wherein the index is a control channel element (CCE) index corresponding to a starting CCE index utilized by the PDCCH.

29. The apparatus of claim 27, wherein the offset is determined based on a broadcast message.

30. The apparatus of claim 18, further comprising, means for receiving information related to a location of a region comprising the resources over at least one of a physical control format indication channel (PCFICH), or an enhanced physical control format indication channel (e-PCFICH), wherein the offset is dependent on the PCFICH or the e-PCFICH.

31. The apparatus of claim 18, wherein the offset is based in part on a number of downlink resources assigned in a subframe.

32. The apparatus of claim 18, wherein the means for determining resources is configured to determine a plurality of resources, and further configured to:
obtain an indicator in an enhanced physical downlink control channel (e-PDCCH); and
select one of the plurality of resources based on the indicator.

33. The apparatus of claim 32, wherein the plurality of resources are configured by radio resource control (RRC).

34. The apparatus of claim 18, further comprising means for modifying the index based on a total number of available resources for retransmission feedback.

35. An apparatus for determining retransmission feedback resources, comprising:
a processing system configured to:
receive a downlink resource assignment over a physical control channel;
obtain an offset related to a region for retransmission feedback resources, wherein the offset is determined based on a type of the physical control channel;
determine resources for communicating retransmission feedback for communications received over the downlink resource assignment based on an index of a resource related to the downlink resource assignment and the offset; and
transmit retransmission feedback for the communications over the resources.

36. The apparatus of claim 35, wherein the type of the control channel is an enhanced physical downlink control channel (e-PDCCH), and the index corresponds to one of an index over which the downlink resource assignment is received, or an index of the resource in the downlink resource assignment.

37. The apparatus of claim 36, wherein the index is an enhanced control channel (eCCE) index, corresponding to a starting eCCE index utilized by the e-PDCCH.

38. The apparatus of claim 37, wherein the processing system is further configured to index eCCEs, wherein indexing of eCCEs is performed over two or more downlink subframes in a sequential manner where the two or more downlink subframes are associated with a same uplink subframe for retransmission feedback.

39. The apparatus of claim 38, wherein the processing system is further configured to receive two or more sets of resources for ePDCCH, wherein the indexing is performed separately for each of the two or more sets.

40. The apparatus of claim 37, wherein the offset is determined based on a unicast message.

41. The apparatus of claim 36, wherein the e-PDCCH is at least one of a distributed e-PDCCH or a localized e-PDCCH.

42. The apparatus of claim 36, wherein the processing system is configured to determine resources based in part on an antenna port index used by the ePDCCH.

43. The apparatus of claim 36, wherein the processing system is configured to determine the resources based at least in part on a scrambling identifier related to the downlink resource assignment.

44. The apparatus of claim 35, wherein the type of the control channel is a legacy physical downlink control channel (PDCCH), and the index corresponds to one of an index over which the downlink resource assignment is received.

45. The apparatus of claim 44, wherein the index is a control channel element (CCE) index corresponding to a starting CCE index utilized by the PDCCH.

46. The apparatus of claim 44, wherein the offset is determined based on a broadcast message.

47. The apparatus of claim 35, wherein the processing system is configured to receive information related to a location of a region comprising the resources over at least one of a physical control format indication channel (PCFICH), or an enhanced physical control format indication channel (e-PCFICH), wherein the offset is dependent on the PCFICH or the e-PCFICH.

48. The apparatus of claim 35, wherein the offset is based in part on a number of downlink resources assigned in a subframe.

49. The apparatus of claim 35, wherein the processing system is configured to determine a plurality of resources, and is further configured to:
obtain an indicator in an enhanced physical downlink control channel (e-PDCCH); and
select one of the plurality of resources based on the indicator.

50. The apparatus of claim 49, wherein the plurality of resources are configured by radio resource control (RRC).

51. The apparatus of claim 35, wherein the processing system is configured to modify the index based on a total number of available resources for retransmission feedback.

52. A computer program product for determining retransmission feedback resources, comprising:
a computer-readable medium comprising code for:
receiving a downlink resource assignment over a physical control channel;
obtaining an offset related to a region for retransmission feedback resources, wherein the offset is determined based on a type of the physical control channel;
determining resources for communicating retransmission feedback for communications received over the downlink resource assignment based on an index of a resource related to the downlink resource assignment and the offset; and
transmitting retransmission feedback for the communications over the resources.

53. The product of claim 52, wherein the type of the control channel is an enhanced physical downlink control channel (e-PDCCH), and the index corresponds to one of an index over which the downlink resource assignment is received, or an index of the resource in the downlink resource assignment.

54. The product of claim 53, wherein the index is an enhanced control channel (eCCE) index, corresponding to a starting eCCE index utilized by the e-PDCCH.

55. The product of claim 54, further comprising code for indexing eCCEs, wherein the indexing of eCCEs is performed over two or more downlink subframes in a sequential manner where the two or more downlink subframes are associated with a same uplink subframe for retransmission feedback.

56. The product of claim 55, further comprising receiving two or more sets of resources for ePDCCH, wherein the indexing is performed separately for each of the two or more sets.

57. The product of claim 54, wherein the offset is determined based on a unicast message.

58. The product of claim 53, wherein the e-PDCCH is at least one of a distributed e-PDCCH or a localized e-PDCCH.

59. The product of claim 53, wherein determining resources is further based in part on an antenna port index used by the ePDCCH.

60. The product of claim 53, further comprising code for determining the resources based at least in part on a scrambling identifier related to the downlink resource assignment.

61. The product of claim 52, wherein the type of the control channel is a legacy physical downlink control channel (PDCCH), and the index corresponds to one of an index over which the downlink resource assignment is received.

62. The product of claim 61, wherein the index is a control channel element (CCE) index corresponding to a starting CCE index utilized by the PDCCH.

63. The product of claim 61, wherein the offset is determined based on a broadcast message.

64. The product of claim 52, further comprising code for receiving information related to a location of a region comprising the resources over at least one of a physical control format indication channel (PCFICH), or an enhanced physical control format indication channel (e-PCFICH), wherein the offset is dependent on the PCFICH or the e-PCFICH.

65. The product of claim 52, wherein the offset is based in part on a number of downlink resources assigned in a subframe.

66. The product of claim 52, comprising code for determining a plurality of resources, and further comprising code for:
  obtaining an indicator in an enhanced physical downlink control channel (e-PDCCH); and
  selecting one of the plurality of resources based on the indicator.

67. The product of claim 66, wherein the plurality of resources are configured by radio resource control (RRC).

68. The product of claim 52, further comprising code for modifying the index based on a total number of available resources for retransmission feedback.

69. A method for determining retransmission feedback resources, comprising:
  communicating a downlink resource assignment to a device over a physical control channel;
  communicating an offset to the device related to a region for retransmission feedback resources, wherein the offset is determined based on a type of the physical control channel;
  determining resources for receiving retransmission feedback for communications received by the device over the downlink resource assignment based on an index of a resource related to the downlink resource assignment and the offset; and
  receiving retransmission feedback from the device over the resources.

70. The method of claim 69, wherein the type of the control channel is an enhanced physical downlink control channel (e-PDCCH), and the index corresponds to one of an index over which the downlink resource assignment is received, or an index of the resource in the downlink resource assignment.

71. The method of claim 70, wherein the index is an enhanced control channel (eCCE) index, corresponding to a starting eCCE index utilized by the e-PDCCH.

72. The method of claim 71, further comprising indexing eCCEs, wherein the indexing of eCCEs is performed over two or more downlink subframes in a sequential manner where the two or more downlink subframes are associated with a same uplink subframe for retransmission feedback.

73. The method of claim 72, further comprising receiving two or more sets of resources for ePDCCH, wherein the indexing is performed separately for each of the two or more sets.

74. The method of claim 71, wherein the offset is determined based on a unicast message.

75. The method of claim 70, wherein the e-PDCCH is at least one of a distributed e-PDCCH or a localized e-PDCCH.

76. The method of claim 70, wherein determining resources is further based in part on an antenna port index used by the ePDCCH.

77. The method of claim 70, further comprising determining the resources based at least in part on a scrambling identifier related to the downlink resource assignment.

78. The method of claim 69, wherein the type of the control channel is a legacy physical downlink control channel (PDCCH), and the index corresponds to one of an index over which the downlink resource assignment is received.

79. The method of claim 78, wherein the index is a control channel element (CCE) index corresponding to a starting CCE index utilized by the PDCCH.

80. The method of claim 78, wherein the offset is determined based on a broadcast message.

81. The method of claim 69, further comprising, communicating information related to a location of a region comprising the resources over at least one of a physical control format indication channel (PCFICH), or an enhanced physical control format indication channel (e-PCFICH), wherein the offset is dependent on the PCFICH or the e-PCFICH.

82. The method of claim 69, wherein the offset is based in part on a number of downlink resources assigned in a subframe.

83. The method of claim 69, wherein determining resources comprises determining a plurality of resources, and further comprises:
  obtaining an indicator in an enhanced physical downlink control channel (e-PDCCH); and
  selecting one of the plurality of resources based on the indicator.

84. The method of claim 83, wherein the plurality of resources are configured by radio resource control (RRC).

85. The method of claim 69, further comprising modifying the index based on a total number of available resources for retransmission feedback.

86. An apparatus for determining retransmission feedback resources, comprising:
  means for communicating a downlink resource assignment to a device over a physical control channel;
  means for communicating an offset to the device related to a region for retransmission feedback resources, wherein the offset is determined based on a type of the physical control channel;
  means for determining resources for receiving retransmission feedback for communications received by the device over the downlink resource assignment based on an index of a resource related to the downlink resource assignment and the offset; and
  means for receiving retransmission feedback from the device over the resources.

87. The apparatus of claim 86, wherein the type of the control channel is an enhanced physical downlink control channel (e-PDCCH), and the index corresponds to one of an index over which the downlink resource assignment is received, or an index of the resource in the downlink resource assignment.

88. The apparatus of claim 87, wherein the index is an enhanced control channel (eCCE) index, corresponding to a starting eCCE index utilized by the e-PDCCH.

89. The apparatus of claim 88, further comprising means for indexing eCCEs, wherein the indexing of eCCEs is performed over two or more downlink subframes in a sequential manner where the two or more downlink subframes are associated with a same uplink subframe for retransmission feedback.

90. The apparatus of claim 89, further comprising receiving two or more sets of resources for ePDCCH, wherein the indexing is performed separately for each of the two or more sets.

91. The apparatus of claim 88, wherein the offset is determined based on a unicast message.

92. The apparatus of claim 87, wherein the e-PDCCH is at least one of a distributed e-PDCCH or a localized e-PDCCH.

93. The apparatus of claim 87, wherein determining resources is further based in part on an antenna port index used by the ePDCCH.

94. The apparatus of claim 87, further comprising means for determining the resources based at least in part on a scrambling identifier related to the downlink resource assignment.

95. The apparatus of claim 86, wherein the type of the control channel is a legacy physical downlink control channel (PDCCH), and the index corresponds to one of an index over which the downlink resource assignment is received.

96. The apparatus of claim 95, wherein the index is a control channel element (CCE) index corresponding to a starting CCE index utilized by the PDCCH.

97. The apparatus of claim 95, wherein the offset is determined based on a broadcast message.

98. The apparatus of claim 86, further comprising means for communicating information related to a location of a region comprising the resources over at least one of a physical control format indication channel (PCFICH), or an enhanced physical control format indication channel (e-PCFICH), wherein the offset is dependent on the PCFICH or the e-PCFICH.

99. The apparatus of claim 86, wherein the offset is based in part on a number of downlink resources assigned in a subframe.

100. The apparatus of claim 86, wherein the means for determining resources is configured to determine a plurality of resources, and is further configured to:
obtain an indicator in an enhanced physical downlink control channel (e-PDCCH); and
select one of the plurality of resources based on the indicator.

101. The apparatus of 100, wherein the plurality of resources are configured by radio resource control (RRC).

102. The apparatus of claim 86, further comprising means for modifying the index based on a total number of available resources for retransmission feedback.

103. An apparatus for determining retransmission feedback resources, comprising:
a processing system configured to:
communicate a downlink resource assignment to a device over a physical control channel;
communicate an offset to the device related to a region for retransmission feedback resources, wherein the offset is determined based on a type of the physical control channel;
determine resources for receiving retransmission feedback for communications received by the device over the downlink resource assignment based on an index of a resource related to the downlink resource assignment and the offset; and
receive retransmission feedback from the device over the resources.

104. The apparatus of claim 103, wherein the type of the control channel is an enhanced physical downlink control channel (e-PDCCH), and the index corresponds to one of an index over which the downlink resource assignment is received, or an index of the resource in the downlink resource assignment.

105. The apparatus of claim 104, wherein the index is an enhanced control channel (eCCE) index, corresponding to a starting eCCE index utilized by the e-PDCCH.

106. The apparatus of claim 105, wherein the processing system is further configured to index eCCEs, wherein the indexing of eCCEs is performed over two or more downlink subframes in a sequential manner where the two or more downlink subframes are associated with a same uplink subframe for retransmission feedback.

107. The apparatus of claim 106, wherein the processing system is further configured to receive two or more sets of resources for ePDCCH, wherein the indexing is performed separately for each of the two or more sets.

108. The apparatus of claim 105, wherein the offset is determined based on a unicast message.

109. The apparatus of claim 104, wherein the e-PDCCH is at least one of a distributed e-PDCCH or a localized e-PDCCH.

110. The apparatus of claim 104, wherein the processing system is configured to determine resources based in part on an antenna port index used by the ePDCCH.

111. The apparatus of claim 104, wherein the processing system is configured to determine the resources based at least in part on a scrambling identifier related to the downlink resource assignment.

112. The apparatus of claim 103, wherein the type of the control channel is a legacy physical downlink control channel (PDCCH), and the index corresponds to one of an index over which the downlink resource assignment is received.

113. The apparatus of claim 112, wherein the index is a control channel element (CCE) index corresponding to a starting CCE index utilized by the PDCCH.

114. The apparatus of claim 112, wherein the offset is determined based on a broadcast message.

115. The apparatus of claim 103, wherein the processing system is further configured to communicate information related to a location of a region comprising the resources over at least one of a physical control format indication channel (PCFICH), or an enhanced physical control format indication channel (e-PCFICH), wherein the offset is dependent on the PCFICH or the e-PCFICH.

116. The apparatus of claim 103, wherein the offset is based in part on a number of downlink resources assigned in a subframe.

117. The apparatus of claim 103, wherein the processing system is configured to determine a plurality of resources, and is further configured to:
obtain an indicator in an enhanced physical downlink control channel (e-PDCCH); and
select one of the plurality of resources based on the indicator.

118. The apparatus of claim 117, wherein the plurality of resources are configured by radio resource control (RRC).

119. The apparatus of claim 103, wherein the processing system is further configured to modify the index based on a total number of available resources for retransmission feedback.

120. A computer program product for determining retransmission feedback resources, comprising:
a computer-readable medium comprising code for:
communicating a downlink resource assignment to a device over a physical control channel;
communicating an offset to the device related to a region for retransmission feedback resources, wherein the offset is determined based on a type of the physical control channel;
determining resources for receiving retransmission feedback for communications received by the device over the downlink resource assignment based on an index of a resource related to the downlink resource assignment and the offset; and
receiving retransmission feedback from the device over the resources.

121. The product of claim 120, wherein the type of the control channel is an enhanced physical downlink control channel (e-PDCCH), and the index corresponds to one of an index over which the downlink resource assignment is received, or an index of the resource in the downlink resource assignment.

122. The product of claim 121, wherein the index is an enhanced control channel (eCCE) index, corresponding to a starting eCCE index utilized by the e-PDCCH.

123. The product of claim 122, further comprising code for indexing eCCEs, wherein the indexing of eCCEs is performed over two or more downlink subframes in a sequential manner where the two or more downlink subframes are associated with a same uplink subframe for retransmission feedback.

124. The product of claim 123, further comprising receiving two or more sets of resources for ePDCCH, wherein the indexing is performed separately for each of the two or more sets.

125. The product of claim 122, wherein the offset is determined based on a unicast message.

126. The product of claim 121 wherein the e-PDCCH is at least one of a distributed e-PDCCH or a localized e-PDCCH.

127. The product of claim 121, further comprising code for determining the resources based in part on an antenna port index used by the ePDCCH.

128. The product of claim 121, further comprising code for determining the resources based at least in part on a scrambling identifier related to the downlink resource assignment.

129. The product of claim 120, wherein the type of the control channel is a legacy physical downlink control channel (PDCCH), and the index corresponds to one of an index over which the downlink resource assignment is received.

130. The product of claim 129, wherein the index is a control channel element (CCE) index corresponding to a starting CCE index utilized by the PDCCH.

131. The product of claim 129, wherein the offset is determined based on a broadcast message.

132. The product of claim 120, further comprising code for communicating information related to a location of a region comprising the resources over at least one of a physical control format indication channel (PCFICH), or an enhanced physical control format indication channel (e-PCFICH), wherein the offset is dependent on the PCFICH or the e-PCFICH.

133. The product of claim 120, wherein the offset is based in part on a number of downlink resources assigned in a subframe.

134. The product of claim 120, further comprising code for determining a plurality of resources, and further code for:
obtaining an indicator in an enhanced physical downlink control channel (e-PDCCH); and
selecting one of the plurality of resources based on the indicator.

135. The product of claim 134, wherein the plurality of resources are configured by radio resource control (RRC).

136. The product of claim 120, further comprising code for modifying the index based on a total number of available resources for retransmission feedback.

* * * * *